United States Patent
Tanaka et al.

(10) Patent No.: US 7,479,984 B2
(45) Date of Patent: Jan. 20, 2009

(54) BROWSING SYSTEM INCLUDING A CAMERA FOR BROWSING A SERVER VIA AN OPERATION SCREEN

(75) Inventors: Hiroshi Tanaka, Asaka (JP); Eiji Ishiyama, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 731 days.

(21) Appl. No.: 10/762,547

(22) Filed: Jan. 23, 2004

(65) Prior Publication Data

US 2006/0132616 A1  Jun. 22, 2006

(30) Foreign Application Priority Data

Jan. 24, 2003 (JP) .............................. 2003-016304
Jan. 16, 2004 (JP) .............................. 2004-009364

(51) Int. Cl.
*H04N 5/225* (2006.01)
*H04N 5/222* (2006.01)

(52) U.S. Cl. ................................ 348/207.2; 348/333.05

(58) Field of Classification Search .............. 348/207.2, 348/207.1, 211.1, 211.2, 211.3, 207.11
See application file for complete search history.

(56) References Cited

U.S. PATENT DOCUMENTS

| | | | | |
|---|---|---|---|---|
| 6,115,137 | A * | 9/2000 | Ozawa et al. ............. | 348/211.4 |
| 6,693,665 | B1 * | 2/2004 | Shindo et al. ............ | 348/207.2 |
| 6,876,382 | B1 * | 4/2005 | Sakamoto ................ | 348/207.2 |
| 6,970,265 | B2 * | 11/2005 | Ho ........................... | 358/1.16 |
| 7,038,714 | B1 * | 5/2006 | Parulski et al. ........... | 348/207.2 |
| 2002/0087546 | A1 * | 7/2002 | Slater et al. .................... | 707/10 |
| 2002/0149677 | A1 | 10/2002 | Wright | |
| 2003/0195802 | A1 * | 10/2003 | Hensen et al. ................ | 705/14 |

FOREIGN PATENT DOCUMENTS

| | | |
|---|---|---|
| EP | 0 867 817 A2 | 9/1998 |
| EP | 0 984 627 A1 | 3/2000 |
| EP | 0 996 307 A1 | 4/2000 |
| EP | 1 102 159 A2 | 5/2001 |
| JP | 9-149325 A | 6/1997 |
| JP | 10-224676 A | 8/1998 |
| JP | 11-249709 A | 9/1999 |
| JP | 11-328081 A | 11/1999 |
| JP | 2000-196799 A | 7/2000 |
| JP | 2000-298647 A | 10/2000 |
| JP | 2001-75890 A | 3/2001 |

(Continued)

OTHER PUBLICATIONS

Ken Goldberg et al.; Computer Networks and ISDN Systems; vol. 28, No. 1, Dec. 1995, pp. 209-219.

(Continued)

*Primary Examiner*—John M Villecco
(74) *Attorney, Agent, or Firm*—Birch, Stewart, Kolasch & Birch, LLP

(57) ABSTRACT

In operation of a server such as a printer with use of a client such as a digital camera, the client can operate the server without having a complex configuration therefor. The printer is connected to the digital camera for direct printing of image data obtained by the digital camera. An operation screen for operation of the printer is provided to the digital camera 1 as image data.

9 Claims, 23 Drawing Sheets

FOREIGN PATENT DOCUMENTS

| | | |
|---|---|---|
| JP | 2001-136588 A | 5/2001 |
| JP | 2001-222318 A | 8/2001 |
| WO | WO 97/18636 A2 | 5/1997 |
| WO | WO 97/50243 * | 12/1997 |
| WO | WO 2008035655 A1 * | 3/2008 |

OTHER PUBLICATIONS

E. Steinfeld "Leveraging Browsers as Universal Guis", LEV, Dec. 12, 1996.

* cited by examiner startup.xml

```xml
<printer_control_panel version="1.0">
<product name="FUJIFILM NC-100" version="1.0"/>
<panel ID="0001">
<background src="0001.jpg" w="320" h="240"/>
<active_area x="32" y="32" w="112" h="72" href="standard.xml"/>
<active_area x="176" y="32" w="112" h="72" href="index.xml"/>
<active_area x="32" y="136" w="112" h="72" href="multi.xml"/>
</panel>
</printer_control_panel>
```

FIG.10

PRINTER SELECTION

◄ FUJIFILM NC-100 (5A 3B 00 42 88 01 )
FUJIFILM NC-50 (5A 3B 00 11 5C D0 )
XXXXX IJ-30 (00 4F 26 90 01 DB ) ►

FIG.13 multi2.xml

```xml
<printer_control_panel version="1.0">
<product name="FUJIFILM NC-100" version="1.0"/>
<panel ID="0001">
<background src="0031.jpg" w="320" h="240"/>
<active_area x="120" y="104" w="112" h="64" href="startup.xml"/>
</panel>
</printer_control_panel>
```

FIG.22

BROWSING SYSTEM INCLUDING A CAMERA FOR BROWSING A SERVER VIA AN OPERATION SCREEN

This Non-provisional application claims priority under 35 U.S.C. § 119(a) on Patent Application No(s). 2003-016304 and 009364/2004 filed in Japan on Jan. 24, 2003 and Jan. 16, 2004, respectively, the entire contents of which are hereby incorporated by reference.

BACKGROUND OF THE INVENTION

1. Field of the Invention

The present invention relates to a browsing system wherein an operation screen for operating a server is provided to a client from the server as content to be browsed by the client and the server is operated via the operation screen displayed at the client.

2. Description of the Related Art

A so-called direct printing system has been proposed wherein a printer and a digital camera are connected directly to each other without involving a personal computer and printing is carried out by operating the printer with use of the digital camera. In such a direct printing system, a printer understands a command used for a digital camera while the digital camera understands a command for the printer. In this manner, image data to be printed can be selected and printing can be carried out.

However, a memory having enormous capacity would be necessary for a digital camera if the digital camera understood all printers available on the market, regarding sizes of paper usable by the printers, the types of the paper (such as glossy or ordinary paper), the number of images printable on one sheet of paper, and commands for carrying out specialized functions of the respective printers such as recording in a CD-R. Such a digital camera would be costly. Likewise, a printer would need a memory of vast capacity if the printer understood commands for carrying out functions of all digital cameras on the market. Therefore, such a printer would be more expensive. For this reason, only a specific combination of a printer and a digital camera can configure a direct printing system in reality. Even in the case where a direct printing system can be configured, only basic functions of a printer and a digital camera therein can be used.

Therefore, a system has been proposed for enabling control of both a digital camera and a printer without understanding of commands therefor (see Japanese Unexamined Patent Publication Nos. 10(1998)-224676, 2000-196799, and 2001-222318). In such a system, a digital camera has a function of a Web browser and acts as a client while a printer acts as a server. The printer provides to the digital camera an operation screen as content to be displayed on the digital camera, and the Web browser is used as a user interface (UI) of the digital camera. In this manner, even if neither the printer nor the digital camera understands a command for the digital camera or the printer, both can be controlled. A system using a browser of a cellular phone or the like as a UI for controlling a domestic appliance or the like is also known.

In addition, a system has been proposed for operating an apparatus by an input thereto from another apparatus via an operation screen (see Japanese Unexamined Patent Publication Nos. 9(1997)-149325, 11(1999)-249709, 11(1999)-328081, and 2001-136588). In this system, an apparatus such as AV equipment to be controlled (referred to as a target apparatus) and another apparatus such as a TV set used for controlling the target apparatus (referred to as a controlling apparatus) are connected to each other, and the target apparatus sends operation information for controlling the target apparatus (such as image information for displaying an operation screen and audio information for control instruction) to the controlling apparatus. The operation information is displayed on the controlling apparatus, and the controlling apparatus receives an input for controlling the target apparatus via the operation screen.

If such a system is applied to a direct printing system, a digital camera can operate a printer without understanding a command to the printer.

Meanwhile, in the system described in Japanese Unexamined Patent Publication Nos. 10(1998)-224676, 2000-196799, or 2001-222318, the digital camera functions as the Web browser. Therefore, in the case where the content provided from the printer includes characters as character codes, the digital camera needs to store a font for display of the characters. However, since a digital camera is produced for photography and image display, only the minimum amount of fonts is often stored therein for photography and image display. Therefore, in order to display all the characters provided from the printer to the digital camera for display of the operation screen, the digital camera needs to store all of the fonts to be used in the operation screen in relation to the character codes. As a result, a configuration of the digital camera becomes more complex, and the digital camera becomes more expensive.

In the system described in Japanese Unexamined Patent Publication Nos. 9(1997)-149325, 11(1999)-249709, 11(1999)-328081, or 2001-136588, in the case where the operation information is sent in the form of an image to the digital camera, a component such as a button for forming the operation screen needs to be laid out in the operation screen. However, when the component is laid out in the operation screen, a size and a position thereof need to be changed by the digital camera, which leads to a burden on an operator of the digital camera.

Furthermore, in the case where the system according to any one of the Japanese Unexamined Patent Publications described above is applied to a direct printing system, the operation screen is provided from the printer to the digital camera to be displayed at the digital camera while images to be printed are stored in the digital camera. Therefore, in order to display the operation screen on the digital camera for selecting the images to be printed, the printer needs to obtain image data stored in the digital camera, a list of the image data, or a catalog of thumbnail images of the image data in advance. Furthermore, the printer has to provide the operation screen for image selection to the digital camera by generating the operation screen from the image data, the list, or the catalog. In order to obtain the image data from the digital camera, the printer needs to understand the structure of the image data in the digital camera. Therefore, sending and receiving the image data, the list, or the catalog is a time-consuming operation, and the digital camera and the printer become heavily burdened.

SUMMARY OF THE INVENTION

The present invention has been conceived based on consideration of the above circumstances. An object of the present invention is therefore to enable a client such as a digital camera to operate a server such as a printer without having a complex configuration therefor.

Another object of the present invention is to reduce a burden on the client upon display of an operation screen thereat.

Still another object of the present invention is to enable selection of an image to be printed without a burden on a printer and a digital camera in the case where the digital camera and the printer respectively function as the client and the server.

A first browsing system of the present invention comprises a client and a server. The server provides to the client an operation screen including an operation component for operating the server as content to be browsed, and the client comprises browsing means for browsing the content, a display screen for displaying the operation screen as the content to be browsed, and operation means for receiving an instruction used for operating the server via the operation screen. The browsing system is characterized by that the server provides to the client the operation screen comprising only an image including the operation component as the content to be browsed.

The operation component refers to a button for selecting an operation command included in the operation screen, characters comprising the operation command, a logo displayed in the operation screen, or a mark indicating an active area used in the case of a touch panel, for example.

The operation means refers to not only a key or a button for selecting the operation command in the operation screen but also a touch panel for selecting the operation command by touching the operation screen.

The image including the operation component refers to an image having the operation component therein. The image does not refer to the case where an image of the operation component is not integrated with a background image.

In the first browsing system of the present invention, the client may further comprise storage means for storing image data and control means for carrying out procedures for display of the image data on the display screen and for selection from the image data.

In this case, the control means may be activated to carry out the procedure of selection from the image data when the operation means receives an instruction to start selection from the image data via an operation screen therefor.

In the first browsing system of the present invention, the operation screen may have an image size suitable for display on a virtual screen of a predetermined size and have layout of the operation component defined by absolute coordinates in the image size. In this case, the client displays the operation screen on the display screen by reducing or enlarging the operation screen according to a size of the display screen.

Moreover, in the first browsing system of the present invention, the operation screen may comprise image data in JPEG format so that the operation component can be laid out in the operation screen by causing a boundary of the operation component in the operation screen to be located at a position corresponding to a multiple of the number of pixels in a compression block in the image data of the JPEG format.

A first imaging apparatus of the present invention comprises an imaging means for obtaining image data; and a compressing/decompressing means for compressing and decompressing the image data, for use as a client in the first browsing system of the present invention, wherein:

in the case that the operation screen is compressed image data of the operation screen, the compressing/decompressing means decompresses the compressed image data of the operation screen.

A second browsing system of the present invention comprises a digital camera and a printer. The printer provides to the digital camera an operation screen including an operation component for operating the printer as content to be browsed, and the digital camera comprises browsing means for browsing the content to be browsed, a display screen for displaying the operation screen as the content, operation means for receiving an instruction used for operating the printer via the operation screen, imaging means for obtaining image data by photography, storage means for storing the image data, and control means for carrying out procedures for display of the image data on the display screen and for selection from the image data. The second browsing system is characterized by that the control means is activated to carry out the procedure for selection from the image data when the operation means receives an instruction to start selection from the image data via an operation screen therefor.

A second imaging apparatus of the present invention comprises a compressing/decompressing means for compressing and decompressing image data obtained by photography, for use as a digital camera in the second browsing system of the present invention, wherein:

in the case that the operation screen is compressed image data of the operation screen, the compressing/decompressing means decompresses the compressed image data of the operation screen.

According to the present invention, the server provides to the client the operation screen comprising only the image including the operation component as the content to be browsed, and the client displays the operation screen on the display screen. Since the operation screen comprises the image alone, the client can display the operation screen provided from the server on the display screen thereof. Therefore, even in the case where characters are included in the operation screen provided by the server, the characters are a part of the image and not represented by character codes. Therefore, the client does not need to have a font for character display. In this manner, the client can operate the server without having a complex configuration therefor.

Especially, in the case where the client is a digital camera and the server is a printer, a direct printing system can be configured without complicating the configuration of the digital camera.

Furthermore, when the operation means of the client receives the instruction to start image data selection via the operation screen therefor, the control means is activated and carries out the procedure for image data selection. Therefore, the server does not need to access the client for selection from the image data by understanding a structure of the image data in the storage means. Moreover, the client does not need to send to the server the image data, a list of the image data, or thumbnail images. In addition, the server does not need to generate the operation screen for image selection from the image data. Therefore, burdens on the client and the server can be reduced at the time of image selection. Especially, in the case where the client is a digital camera, the digital camera already has a function of displaying images on a display screen thereof and a function for selection from the images. Therefore, the client can carry out image selection without a further burden thereon.

If the operation screen has the image size suitable for display on the virtual screen of the predetermined size and if the layout of the operation component in the operation screen can be defined by the absolute coordinates in the predetermined size, the client can display the operation screen on the display screen thereof by enlarging or reducing the operation screen according to the size of the display screen. In this manner, the client can display the operation screen for operating the server on the display screen thereof by simply enlarging or reducing the operation screen according to the size of the display screen without consideration of the layout of the operation component. Therefore, the client can be less burdened at the time of display of the operation screen.

Meanwhile, an image represented by image data in JPEG format is divided into blocks (compression blocks), and each of the blocks is compressed. Therefore, block distortion is observed around a boundary between the blocks in the image displayed through decompression of the JPEG image data. Therefore, in the case where the operation screen comprises the image data in JPEG format, the operation component is laid out so as to have the boundary at the position represented by the multiple of the number of pixels in the compression block in the image data. In this manner, block distortion does not become conspicuous, and the image quality of the operation screen can be improved.

The first and second imaging apparatuses of the present invention, for use as the client and the digital camera of the first and second browsing systems of the present invention, respectively are provided with compressing/decompressing means for compressing and decompressing the image data obtained thereby. In the case that the operation screen is compressed image data of the operation screen, the compressing/decompressing means decompresses the compressed image data of the operation screen. Therefore, the operation screen is enabled to be displayed without providing an additional means for decompressing the operation screen image data.

BRIEF DESCRIPTION OF THE DRAWINGS

FIG. 10 shows an example of a UI description file;

FIG. 13 shows a printer selection screen;

FIG. 22 shows description in a file "multi2.xml"; and

DESCRIPTION OF THE PREFERRED EMBODIMENT

Figure 1A:
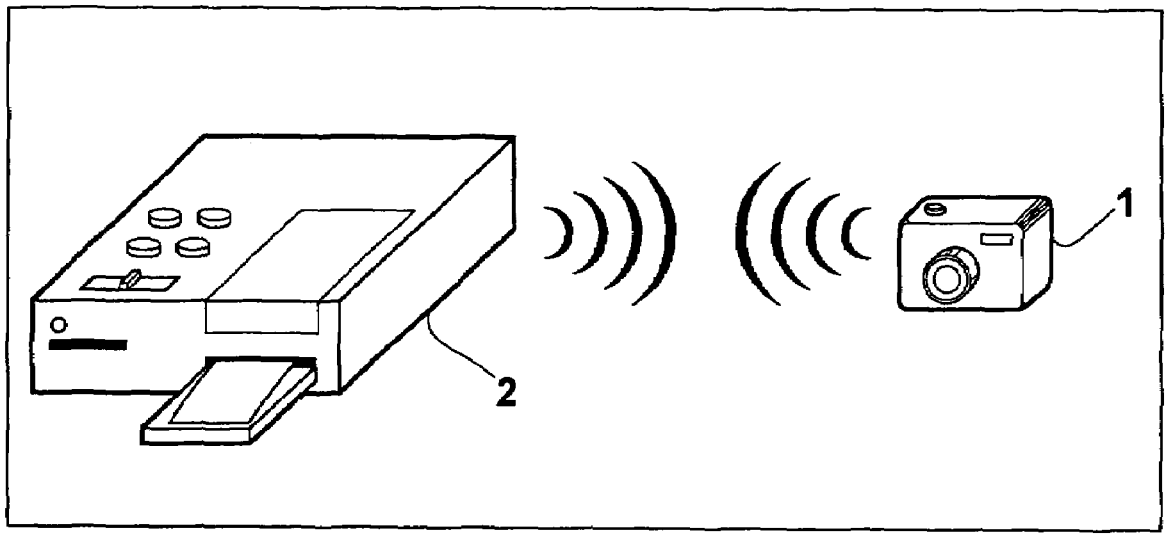
FIGS. 1A and 1B are diagrams showing configurations of a direct printing system adopting a browsing system of an embodiment of the present invention.
Figure 1B:
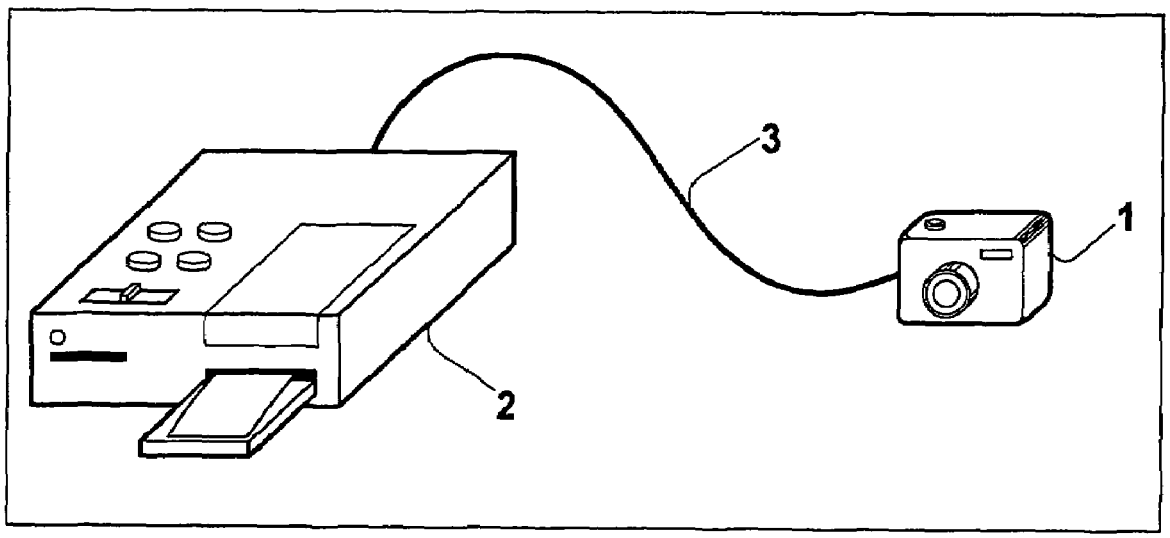

Hereinafter, an embodiment of the present invention will be explained with reference to the accompanying drawings. FIGS. 1A and 1B are diagrams showing configurations of a direct printing system adopting a browsing system of an embodiment of the present invention. As shown in FIG. 1A, the direct printing system in the first embodiment has a digital camera 1 as a client and a printer 2 as a server, and the digital camera 1 and the printer 2 are connected wirelessly to each other. The digital camera 1 is used to operate the printer 2 for printing an image data set or image data sets (hereinafter referred to as the image data sets) obtained by the digital camera 1. As shown in FIG. 1B, the digital camera 1 and the printer 2 may be connected to each other by a cable 3 that supports a standard such as IEEE1394, USB, or Ethernet so that the digital camera 1 can be used to operate the printer 2 for printing the image data sets obtained by the digital camera 1. The printer 2 may also be connected to the digital camera 1 via the Internet instead of being connected directly by the cable 3.

Figure 2:
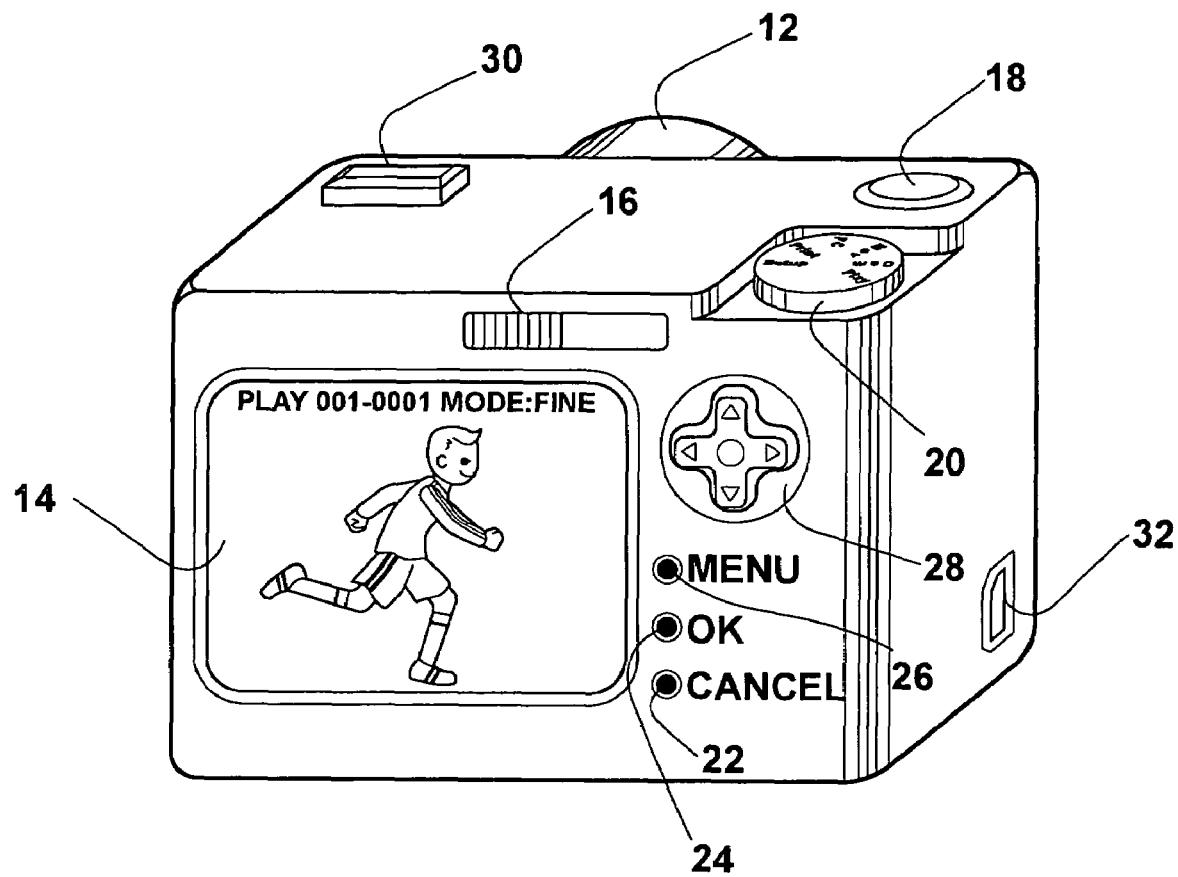
FIG. 2 is a perspective view of a digital camera.

FIG. 2 is a perspective view of the digital camera 1. As shown in FIG. 2, the digital camera 1 has a lens 12, a liquid crystal display (LCD) 14, a power switch 16, a release button 18, a mode switching dial 20, a Cancel button 22, an OK button 24, a Menu button 26, a cruciform key 28, an antenna 30, and a connector 32. The lens 12 is used for photographing a subject image. The LCD 14 displays various kinds of information such as the image data sets and a frame number. The power switch 16 is used for starting or stopping the digital camera 1. The release button 18 is used for photography by a user of the digital camera 1. The mode switching dial 20 is used for setting a mode by selection from various modes available to the digital camera 1, such modes for photography, image reproduction, and direct printing. The Cancel button 22 is pressed for deleting an item displayed on the LCD 14, for stopping processing, and for canceling selected processing. The OK button 24 is pressed for execution of a selected one of items displayed on the LCD 14. The Menu button 26 is pressed for menu display in each of the modes. The cruciform key 28 comprises up, down, right and left keys and is used for incrementing or decrementing the frame number displayed on the LCD 14 and for menu selection, for example. The antenna 30 is used for wireless communication with the printer 2. The connector 32 is used for wired communication with the printer 2.

Figure 3:
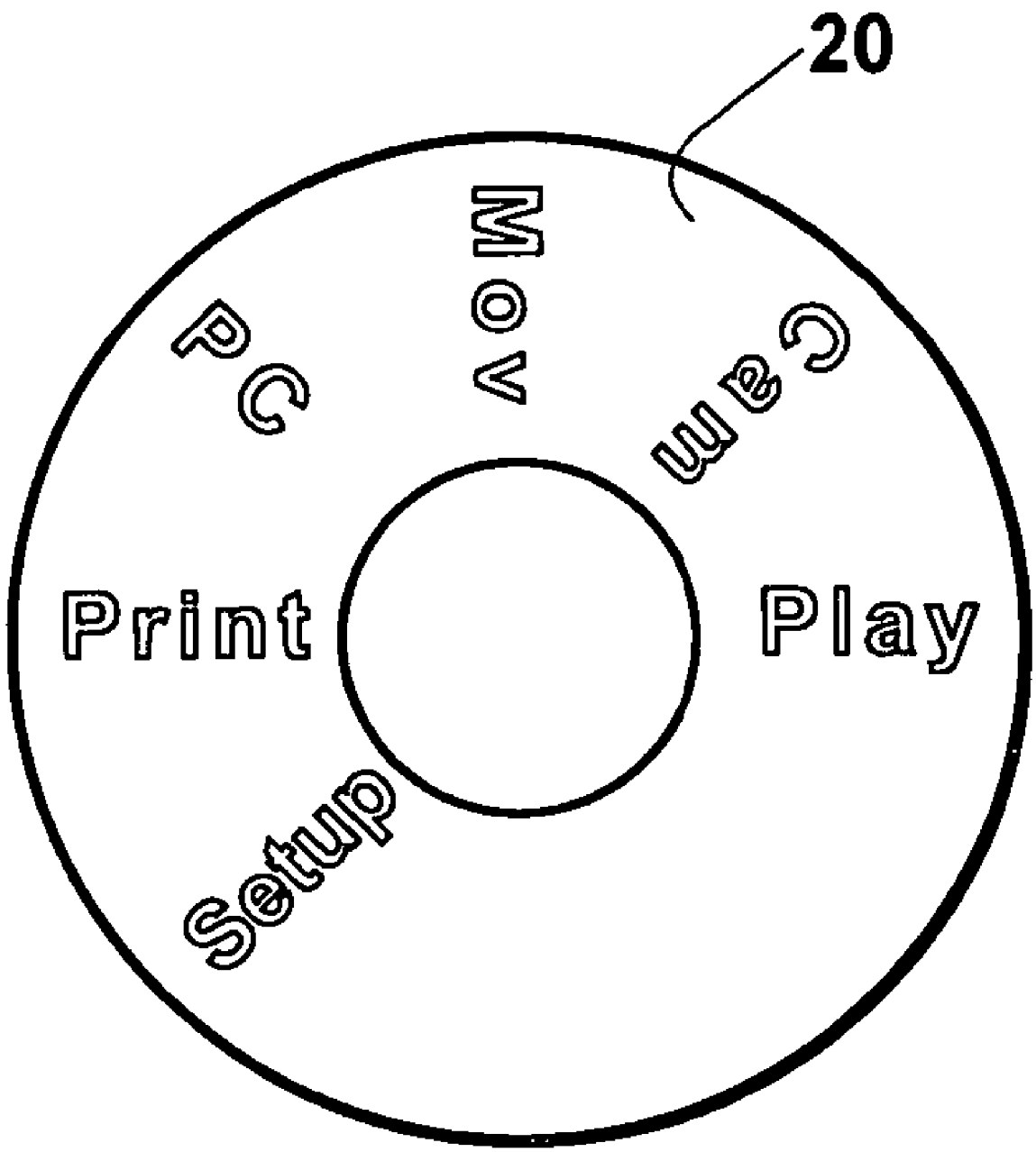
FIG. 3 is a top view of a mode switching dial.

FIG. 3 is a top view of the mode switching dial 20. As shown in FIG. 3, the mode switching dial 20 enables switching between a setup mode (Setup) for setting the digital camera 1, a direct printing mode (Print), a PC mode (PC) for transferring the image data sets to a personal computer by being connected to the personal computer, a moving image mode (Mov) for photographing a moving image, a camera mode (Cam) for photographing a still image, and a reproduction mode (Play) for displaying a photographed image on the LCD 14. FIG. 3 shows a state wherein the mode switching dial 20 has been switched to the direct printing mode.

Figure 4:
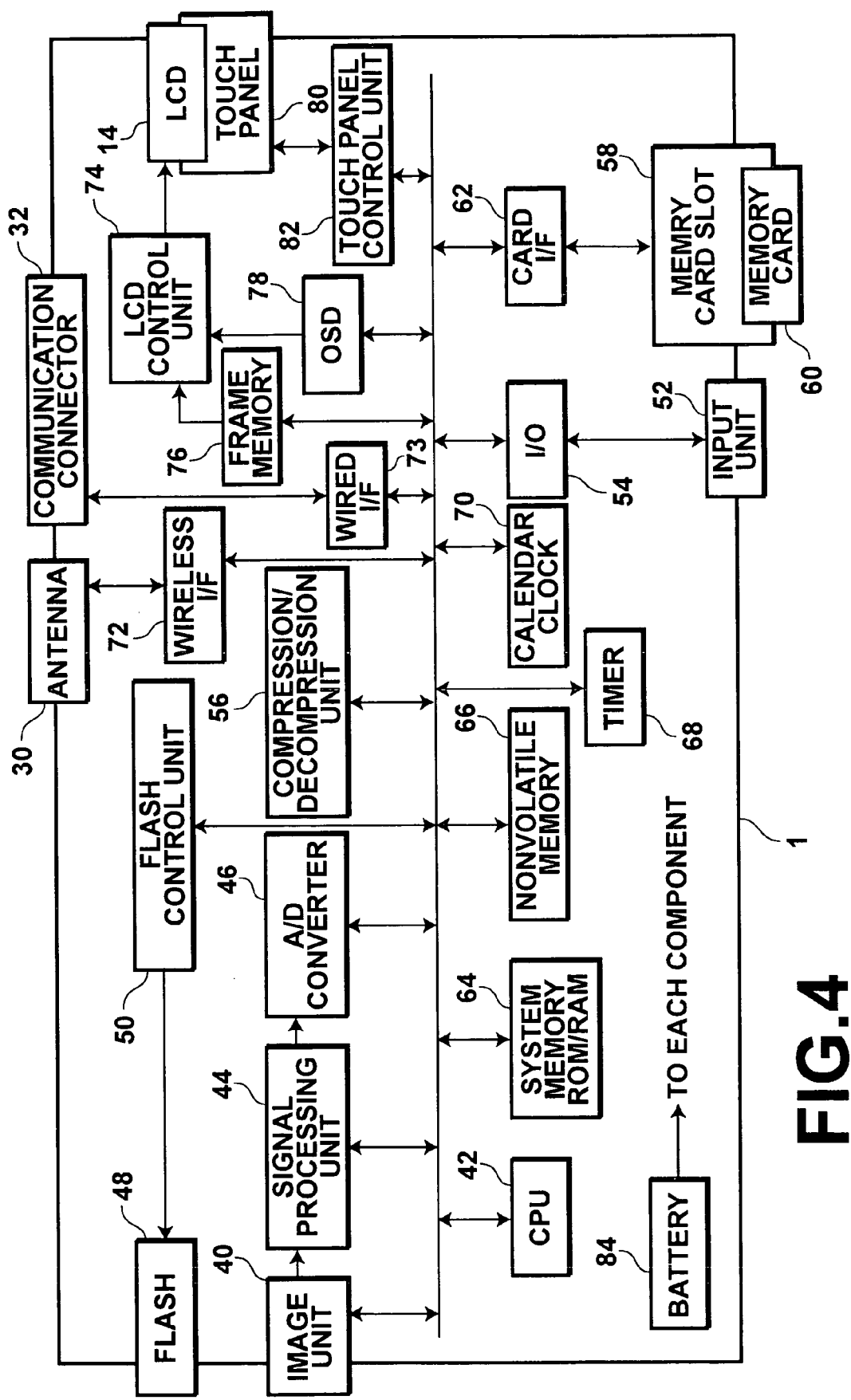
FIG. 4 is a block diagram showing a signal processing system of the digital camera.

FIG. 4 is a block diagram showing a signal processing system of the digital camera 1. The digital camera 1 comprises an imaging unit 40, a CPU 42, a signal processing unit 44, an A/D converter 46, a flash 48, a flash control unit 50, an input unit 52, and an I/O interface 54. The imaging unit 40 generates images of subjects on a photoreceptor surface, and carries out photoelectric conversion for outputting the images as the image data sets. The CPU 42 controls the entire camera 1, and carries out sampling timing control regarding the image data sets, recording control regarding the image data sets, communication control, display control, and operation screen browsing control, for example. The signal processing unit 44 carries out image size change, sharpness correction, gamma correction, contrast correction, white balance correction, and the like. The A/D converter 46 carries out analog-to-digital conversion on the image data sets. The flash control unit 50 controls operation of the flash 48. The input unit 52 is used by the user for inputting information, and comprises the release button 18, the mode switching dial 20, the Cancel button 22, the OK button 24, the Menu button 26, and the cruciform key 28. The I/O interface 54 is used for inputting the information from the input unit 52.

The digital camera 1 also comprises a compression/decompression unit 56, and a card interface 62. The compression/decompression unit 56 compresses the image data sets obtained by the imaging unit 40 according to a format such as JPEG or motion JPEG, and decompresses the compressed image data sets. The card interface 62 converts the image data sets to read and record the image data sets from and in a memory card 60 that is detachable from a memory card slot 58. The memory card 60 is a detachable recording medium using semiconductors, magnetic recording, or optical recording, for example.

The digital camera 1 further comprises a system memory 64, a nonvolatile memory 66, a timer 68, a calendar clock 70, a wireless interface 72, a wired interface 73, an LCD control unit 74, a frame memory 76, an OSD 78, a touch panel 80, and a touch panel control unit 82. The system memory 64 comprises a ROM and a RAM. The ROM stores various constants and programs including a program for a Web browser and a program for carrying out an image selection routine. The RAM is storage means that acts as a workspace at the time of execution of the programs. The nonvolatile memory 66 is a rewritable memory and can store set constants of the digital camera 1 after power supply is cut. The timer 58 is activated at the time of timer photography. The calendar clock 70 indicates the current time and date. The wireless interface 72 is used for sending and receiving the image data sets and various kinds of information via wireless communication with the printer 2. The wired interface 73 is used for sending and receiving the image data sets and the various kinds of information via wired communication with the printer 2, and the wired interface 73 supports a standard such as USB, IEEE1394, or Ethernet. The LCD control unit 74 carries out digital-to-analog conversion and the like for displaying the image data sets on the LCD 14. The frame memory 76 comprises a VRAM or the like for temporarily storing the image data sets to be displayed, as instructed by the CPU 42. The OSD 78 converts code information instructed by the CPU 42 into characters and message data to be displayed, and carries out on-screen display of the characters and the message data together with an image. The touch panel 80 is used for various kinds of inputs from the LCD 14. The touch panel control unit 82 controls the touch panel 80. The digital camera 1 further comprises a battery 84 for supplying power to each of the components thereof.

The CPU 42 functions as browsing means by executing the program of the Web browser read from the system memory 64.

The nonvolatile memory 66 stores a MAC address of the printer 2 that is necessary for communication with the printer 2 in the direct printing mode that will be explained later. In the case where a plurality of printers are used as the printer 2 for direct printing, the nonvolatile memory 66 stores MAC addresses of the printers.

In this embodiment, both the touch panel 80 and the input unit 52 can be used for inputting information.

The wireless interface 72 is connected to the antenna 30 while the wired interface 73 is connected to the communication connector 32. In this manner, the various kinds of information including the image data sets can be sent to and received from communication equipment such as the printer 2.

The wireless interface 72 is an interface using radio waves, ultrasonic waves, or infrared rays. In the case where radio waves are used, a specification of wireless communication such as a wireless LAN (Local Area Network) may be adopted.

Figure 5:
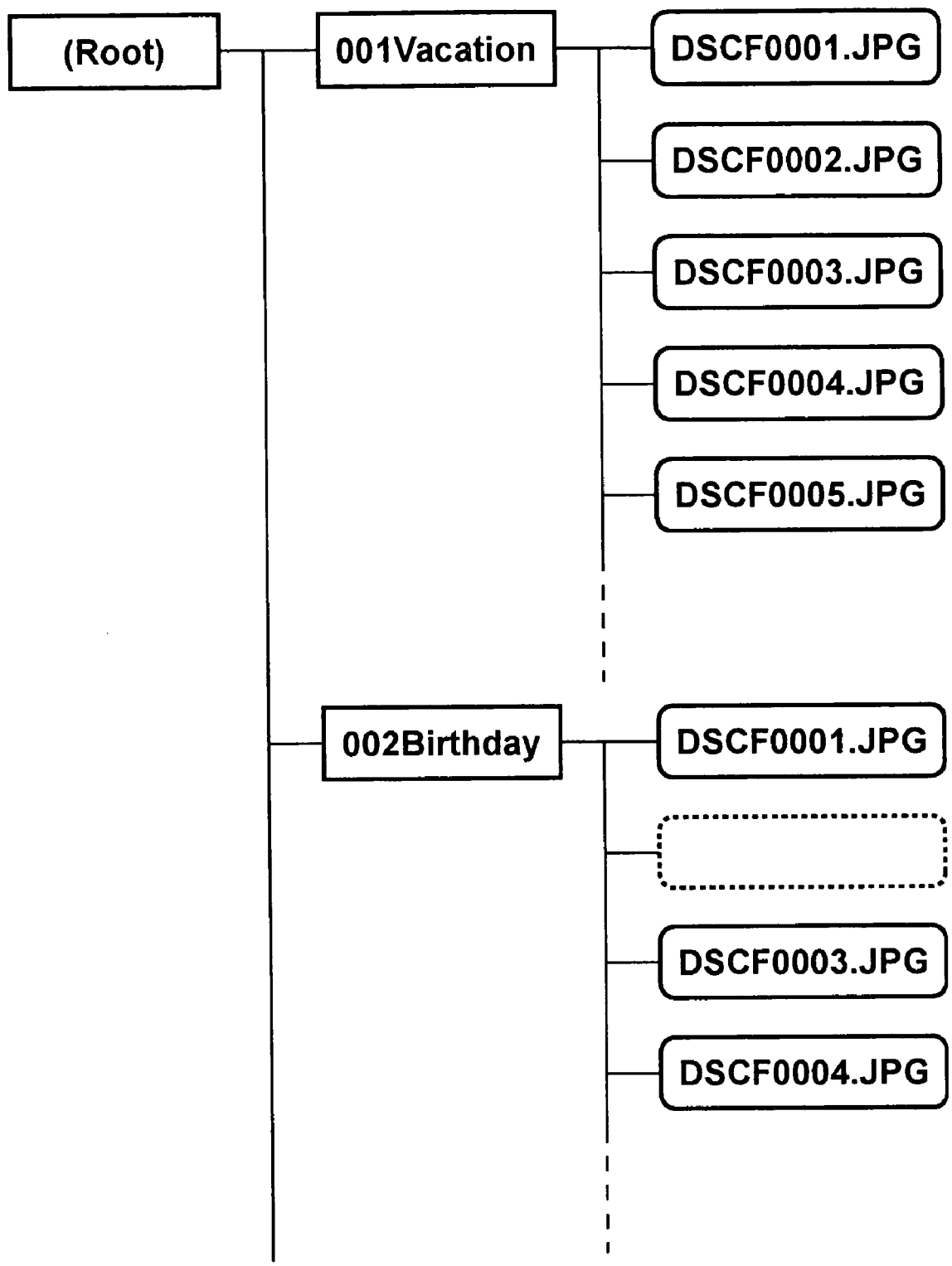
FIG. 5 shows a structure of image data storage.

FIG. 5 shows a structure in which the image data sets are stored in the memory card 60. As shown in FIG. 5, directories respectively having a three-digit number and a name ("001Vacation" and "002Birthday" in FIG. 5) are formed under a root directory (Root). The image data sets each having a serial file name including a four-digit number (such as DSCF0001.JPG) are stored in the corresponding directories. In the case where some of the serial file names are missing as in the case of DSCF0002.JPG in the directory 002Birthday, the image data sets corresponding to the missing file names do not exist. The three-digit number represents a directory number, and the four-digit number of the image data sets corresponds to the frame number. In this manner, the image data set having the file name DSCF0001.JPG in the directory 001Vacation can be expressed as 001-0001 by combining the directory number and the frame number thereof, for example. In the case where each of the image data sets is displayed on the LCD 14, the directory number and the frame number are displayed as "001-0001".

Figure 6:
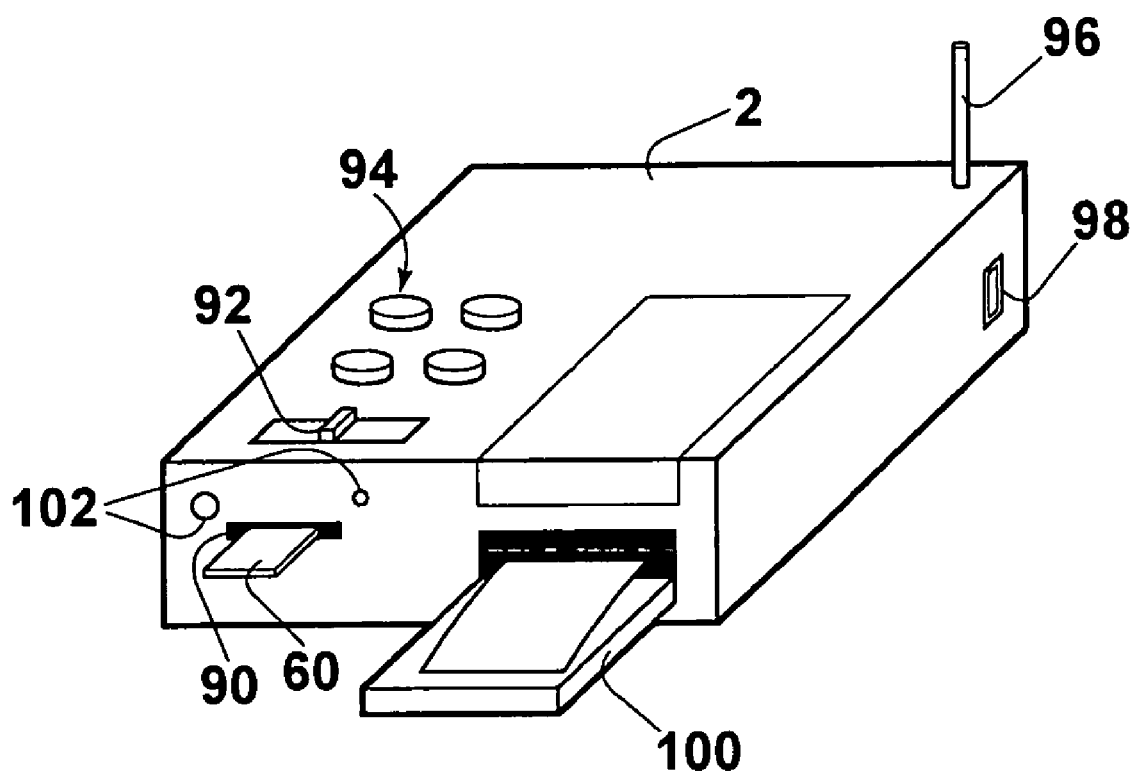
FIG. 6 is a perspective view of a printer.

FIG. 6 shows a perspective view of the printer 2. As shown in FIG. 6, the printer 2 has a card slot 90 for inserting the memory card 60 therein and a mode switch 92 for setting a mode for reading out the image data sets to the printer 9. The printer 2 further comprises operation switches 94 for operating the printer 2, an antenna 96 for wireless communication with the digital camera 1, a communication connector 98 for wired communication with the digital camera 1, a paper tray 100 for receiving a print, and lamps 102 having an LED or the like for displaying a state of the printer 2.

Figure 7:
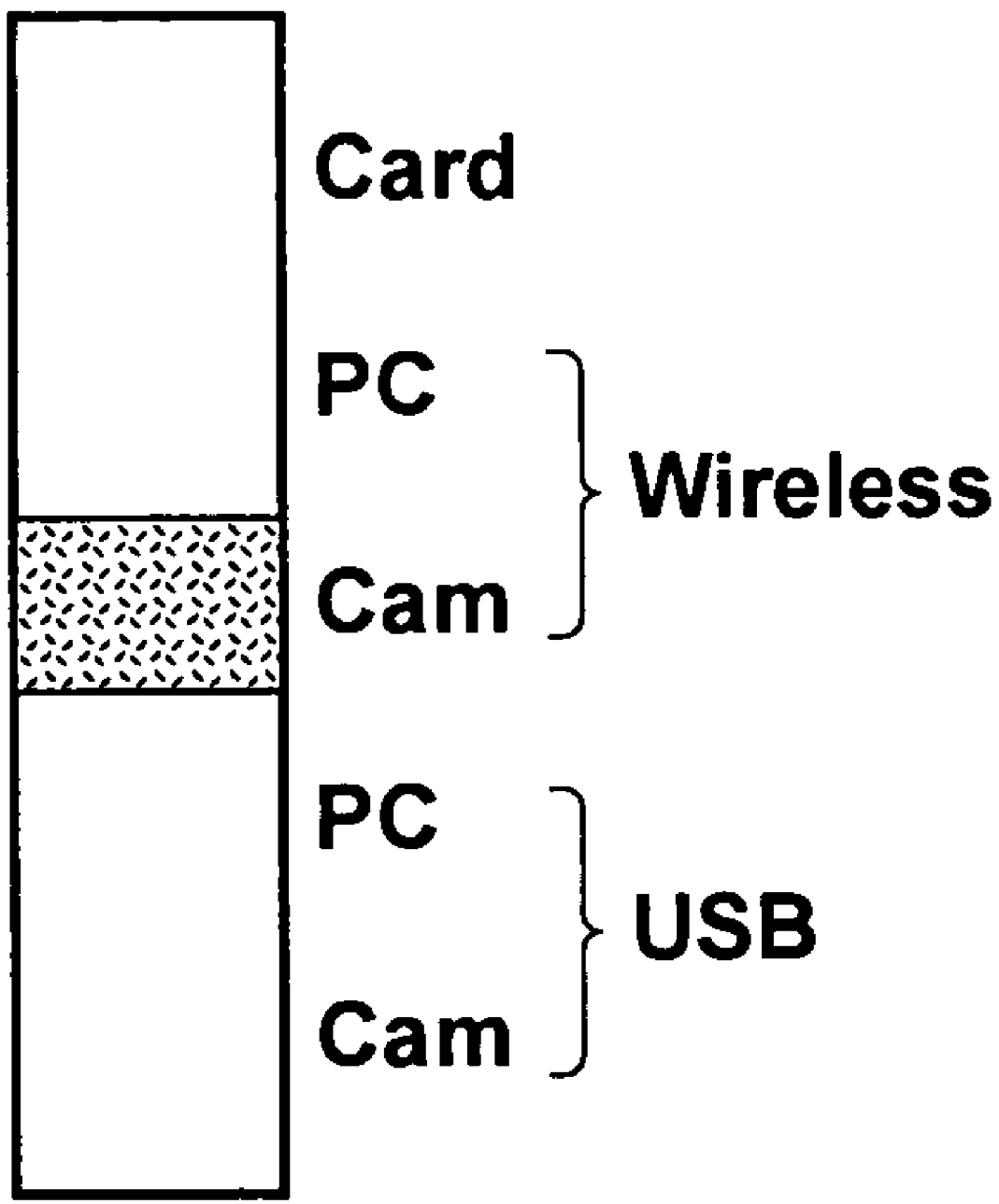
FIG. 7 is a top view of a mode switch.

FIG. 7 is a top view of the mode switch 92. As shown in FIG. 7, the mode switch 92 enables switching between a card mode (Card) for reading the image data sets from the memory card 60, a wireless personal computer mode (PC(Wireless)) for reading the image data sets from the personal computer, a wireless camera mode (Cam(Wireless)) for wireless reading of the image data sets from the digital camera 1, a wired personal computer mode (PC) for reading the image data sets from the personal computer that has a wired connection thereto, and a wired camera mode (Cam) for reading the image data sets from the digital camera 1 that is connected by the cable 3. In FIG. 7, a state is shown wherein the mode switch 92 is set to the wireless camera mode.

In this embodiment, it is assumed that the printer 2 is used while being connected to the digital camera 1 or to the personal computer. During use of the printer 2 connected to the personal computer, the user operates the printer 2 through display of operation screens on the personal computer. In the case where direct printing is carried out by connecting the printer 2 with the digital camera 1, the user can operate the printer 2 through display of an operation screen on the LCD 14 of the digital camera 1. Therefore, the printer 2 does not have a display screen for operation thereof.

Figure 8:
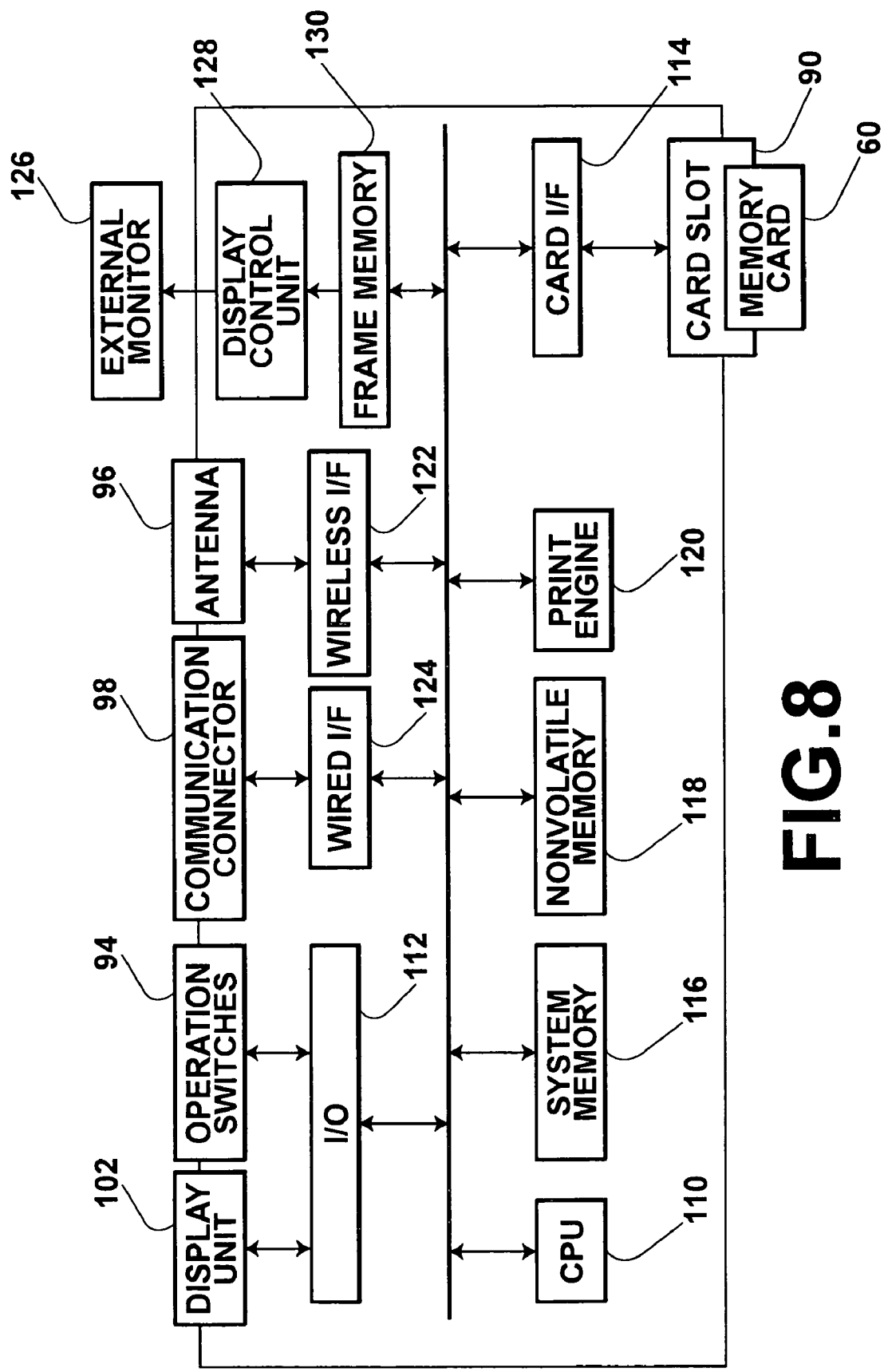
FIG. 8 is a block diagram showing a signal processing system of the printer.

FIG. 8 is a block diagram showing a signal processing system in the printer 2. The printer 2 has a CPU 110, an I/O interface 112, a card interface 114, a system memory 116, a nonvolatile memory 118, a print engine 120, a wireless interface 122, a wired interface 124, a display control unit 128, and a frame memory 130. The CPU 110 controls the entire printer 2. In addition, the CPU 110 controls image data reading, printing, communication, and the lamps 102. The I/O interface I/O 112 is an interface for inputting settings of the operation switches 94 and the lamps 102. The card interface 114 carries out data conversion for reading and recording the image data sets from and in the memory card 60 inserted in the card slot 90. The system memory 116 comprises a ROM that stores a program and a constant for the CPU 110 and a RAM that is storage means used as a workspace at the time of execution of the program. The nonvolatile memory 118 is a rewritable memory that can store constants for various settings of the printer 2 after power supply is stopped. The print engine 120 comprises a printing head, a light source, and a paper feeding mechanism for carrying out printing. The wireless interface 122 is used for sending and receiving the image data sets and the various kinds of information to and from the digital camera 1 through wireless communication therewith. The wired interface 124 supports a standard such as USB, IEEE1394, or Ethernet used for sending and receiving the image data sets and the various kinds of information to and from the digital camera 1 via wired communication. The display control unit 128 carries out D/A conversion and the like for displaying the image data sets on an external monitor 126 connected to the printer 2. The frame memory 130 comprises a VRAM or the like for temporarily storing the image data sets to be displayed, as instructed by the CPU 110.

The nonvolatile memory 118 stores user interface (UI) description files and UI image data representing UI images for displaying the operation screens on the digital camera 1 at the time of direct printing as will be explained later.

The wireless interface 122 is connected to the antenna 96 while the wired interface 124 is connected to the communication connector 98. In this manner, various kinds of information including the image data sets can be sent to and received from communication equipment such as the digital camera 1.

The wireless interface 122 is an interface using radio waves, ultrasonic waves, or infrared rays. In the case where the radio waves are used, a specification of wireless communication such as a wireless LAN may be adopted.

Figure 9:
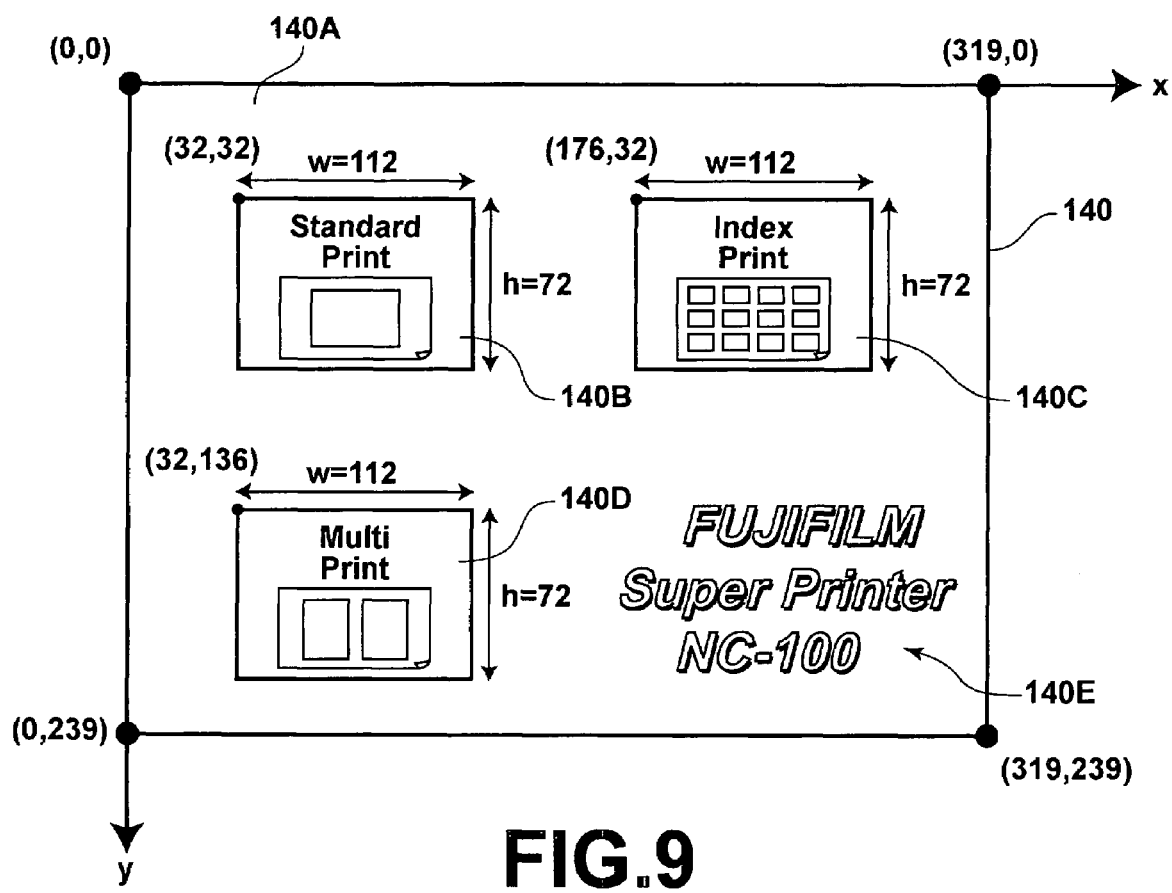
FIG. 9 shows an example of a UI image.

FIG. 9 shows an example of the UI images. In FIG. 9 is shown a UI image 140 representing an initial operation screen that is displayed on the digital camera 1 at the time of direct printing. The UI image 140 shown in FIG. 9 comprises a background image 140A. On the background image 140A are laid out images representing three active areas 140B, 140C, and 140D as operation components, and a logo 140E. The active areas 140B, 140C, and 140D are areas that can be selected via the touch panel 80. By displaying the UI image 140 on the LCD 14 and by touching any one of the active areas 140B, 140C and 140D therein, an instruction corresponding to the touched one of the active areas is sent from the digital camera 1 to the printer 2. Alternatively, the instruction may be sent from the digital camera 1 to the printer 2 by selecting the active area with use of the cruciform key 28 and by pressing the OK button 24.

In the UI image 140 shown in FIG. 9, the active areas 140B, 140C and 140D respectively represent print menus "StandardPrint", "IndexPrint" and "MultiPrint". The menu StandardPrint is a menu for printing one image on one sheet. The menu IndexPrint is a menu for printing a plurality of thumbnail images on one sheet, while the menu MultiPrint is a menu for printing a plurality of images on one sheet. The user can select any one of the printing menus by selecting the corresponding one of the active areas.

The UI image 140 has an image size to be used for display on a virtual screen having a size that is a standard for the digital camera 1. In this embodiment, the number of pixels in the virtual screen is 320×240. The upper left corner of the UI image 140 is assumed to be the origin, and the horizontal and vertical sides thereof are also assumed to be x and y axes. Values of coordinates in the lower right corner of the UI image 140 are (319, 239). The printer 2 sends to the digital camera 1 the UI image data representing the UI image 140 as they are. The file name of the UI image data representing the UI image 140 for display of the initial operation screen is "0001.jpg".

When the digital camera 1 receives the UI image data, the digital camera 1 reduces or enlarges the UI image 140 so that the UI image 140 becomes suitable for a size of the LCD 14 thereof. In this manner, the digital camera 1 displays the UI image 140 as the initial operation screen on the LCD 14. For example, if the LCD 14 has 240×180 pixels, the UI image 140 is reduced to 75% and the reduced UI image 140 is displayed on the LCD 14. The signal processing unit 44 carries out the reduction or enlargement. In the case where the LCD 14 has 320×240 pixels, no reduction or enlargement is carried out and the UI image 140 is displayed on the LCD 14 as it is.

The UI image data are compressed according to a format such as JPEG, TIFF, or GIF for reducing a data size thereof. The digital camera 1 decompresses the UI image data by using the compression/decompression unit 56, and carries out the reduction or enlargement for display on the LCD 14.

Image data in JPEG format are generated through division of an image into blocks and compression of each of the blocks. Therefore, block distortion is observed at boundaries between the blocks in the image displayed after decompression of the JPEG image data. For this reason, in this embodiment, in the case where the UI image data are of JPEG format, the active areas 140B, 140C, and 140D are positioned in the background image 140A in a manner such that the boundaries of the active areas are located at multiples of the compression blocks (8×8 pixels).

For example, values of the x coordinate of the left side and the right side of the active area 140B are 32 and 144, which are multiples of 8. Values of the y coordinate of the upper side and the lower side thereof are 32 and 104, which are also multiples of 8. Likewise, values of the x coordinate of the left and right sides of the active area 140C are 176 and 288, while values of the y coordinate of the upper and lower sides thereof are 32 and 104. Values of the x coordinate of the left and right sides of the active area 140D are 32 and 144, while values of the y coordinate of the upper and lower sides thereof are 136 and 208.

In this manner, block distortion is not conspicuous when the UI image 140 is displayed on the LCD 14, which leads to improvement in image quality of the UI image 140.

FIG. 10 shows an example of descriptions in one of UI description files. The UI description file in FIG. 10 is used for display of the UI image 140 shown in FIG. 9 as the initial operation screen. As shown in FIG. 10, the UI description file has a file name "startup.xml". The description in the fourth line specifies the UI image data having the file name "0001.jpg" and having 320×240 pixels as a width w and a height h for the operation screen. The description in the fifth to seventh lines shows positions, sizes, and hyperreferences (shown as href in FIG. 10) of the active areas 140B, 140C, and 140D. More specifically, the positions of the active areas are specified by the coordinates of the upper left corner thereof while the sizes thereof are specified by the width w and the height h. The hyperreferences show the file names of the UI description files to be sent when the corresponding active areas are selected.

The digital camera 1 functions as a Web browser when connected to the printer 2, and requests the file whose file name is startup.xml from the printer 2. Since the file name startup.xml is fixed, the initial operation screen can be displayed on the LCD 14 of the digital camera 1, regardless of the model of the printer 2. When the UI description file having the file name startup.xml is sent from the printer 2, the digital camera 1 interprets the description in the file. The digital camera 1 then requests the UI image data from the printer 2, and sets the active areas for operation by the touch panel 80 at the positions in the operation screen displayed on the LCD 14 as specified by the UI description file.

Figure 11:
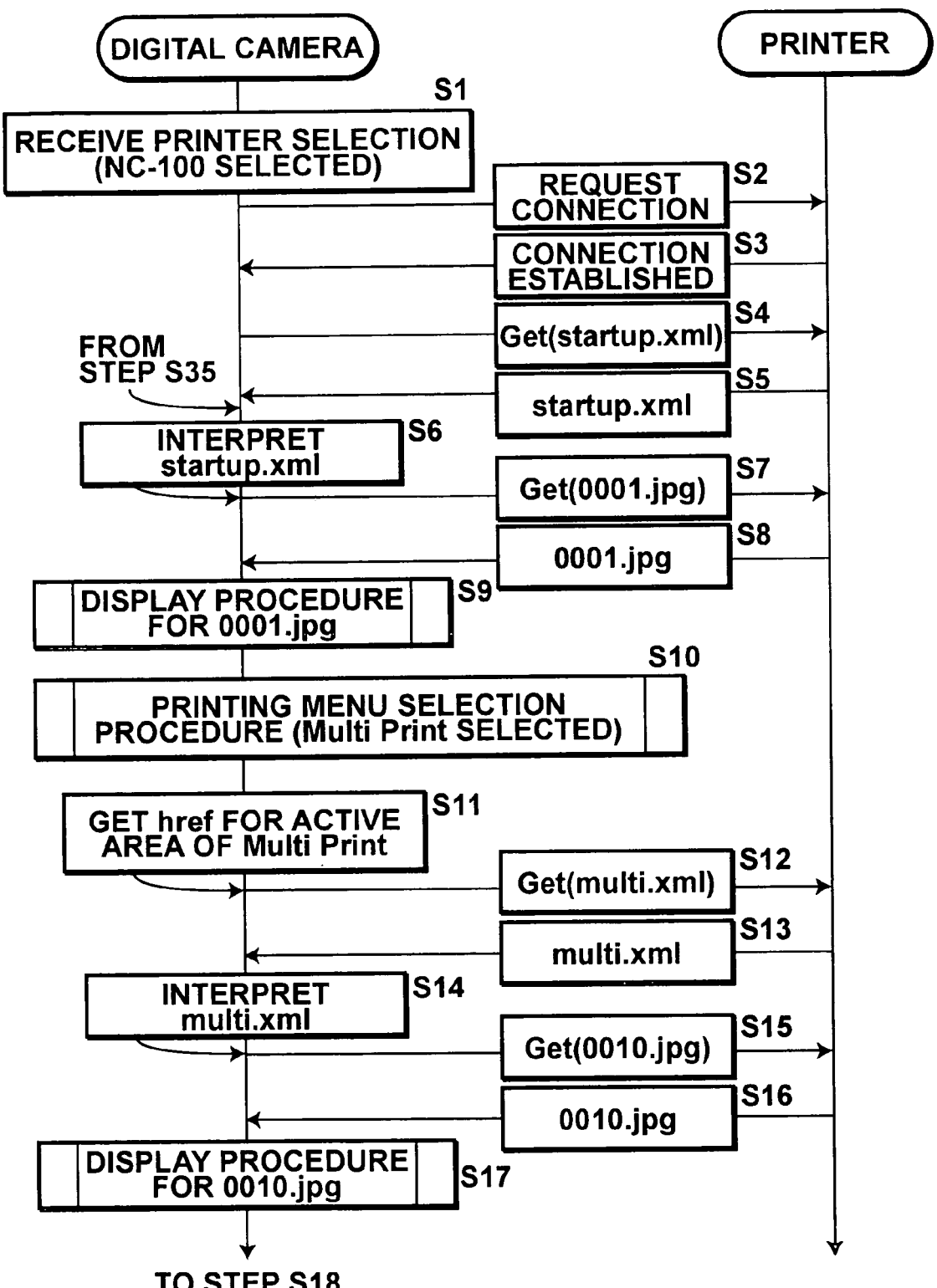
FIG. 11 is a flow chart (part 1) showing a procedure carried out in the digital camera and the printer.
Figure 12:
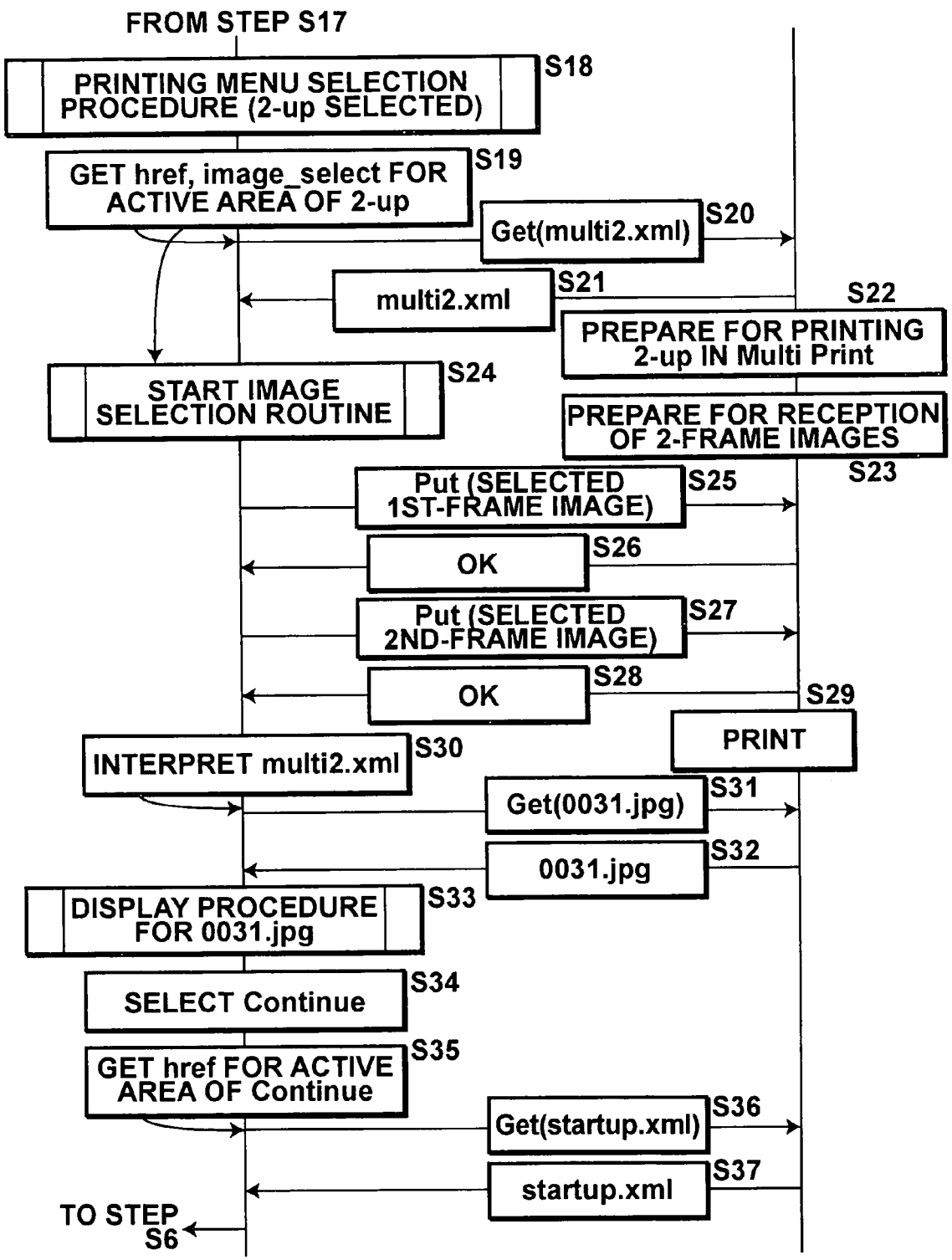
FIG. 12 is the flow chart (part 2) showing the procedure carried out in the digital camera and the printer.

A procedure carried out in this embodiment will be explained next. FIGS. 11 and 12 represent a flow chart showing the procedure carried out by the digital camera 1 and the printer 2. In this embodiment, the mode switching dial 20 of the digital camera 1 is set to the direct printing mode, and the mode switch 92 of the printer 2 is set to the wireless camera mode. Consequently, the case will be explained where the image data sets obtained by the digital camera 1 are printed by the printer 2 through wireless communication between the printer 2 and the camera 1. In the procedure carried out by the digital camera 1, when the user presses the Cancel button 22, processing at any one of the steps can be cancelled and the procedure returns to Step S1.

When the user of the digital camera 1 sets the mode switching dial 20 to the direct printing mode, the digital camera 1 displays on the LCD 14 a screen for selecting the printer 2 to carry out printing. Selection of the printer 2 by the user is then received (Step S1).

FIG. 13 shows the printer selection screen. As shown in FIG. 13, three model names "FUJIFILM NC-100", "FUJIFILM NC-50" and "xxxxx IJ-30" are displayed for the printer 2 on the LCD 14. When the user touches either one of triangle marks in the screen or uses the cruciform key 28 for upward or downward scrolling, further model names for the printer 2 can be displayed for direct printing. Each of the model names accompanies the MAC address thereof.

In this embodiment, the user is assumed to have selected the model name FUJIFILM NC-100. When the user 2 selects the model name of the printer 2, the color of the selected printer name is inverted on the display, and the digital camera 1 sends a connection request to the printer 2 via the wireless interface 72 and the antenna 30 (Step S2). The printer 2 establishes the connection in response to the request, and notifies the digital camera 1 of connection establishment (Step S3). The digital camera 1 requests the description file having the file name "startup.xml" (corresponding to the description "Get (startup.xml)" in FIG. 11) from the printer 2 (Step S4), and the printer 2 sends the file startup.xml to the digital camera 1 in response to the request (Step S5).

The digital camera 1 interprets the file startup.xml (Step S6), and requests the UI image data having the file name "0001.jpg" ("Get(0001.jpg)" in FIG. 11) from the printer 2 for display of the initial operation screen (Step S7). The printer 2 sends the file 0001.jpg to the digital camera 1 in response to the request (Step S8), and the digital camera 1 carries out a procedure for displaying the initial operation screen (Step S9).

Figure 14:
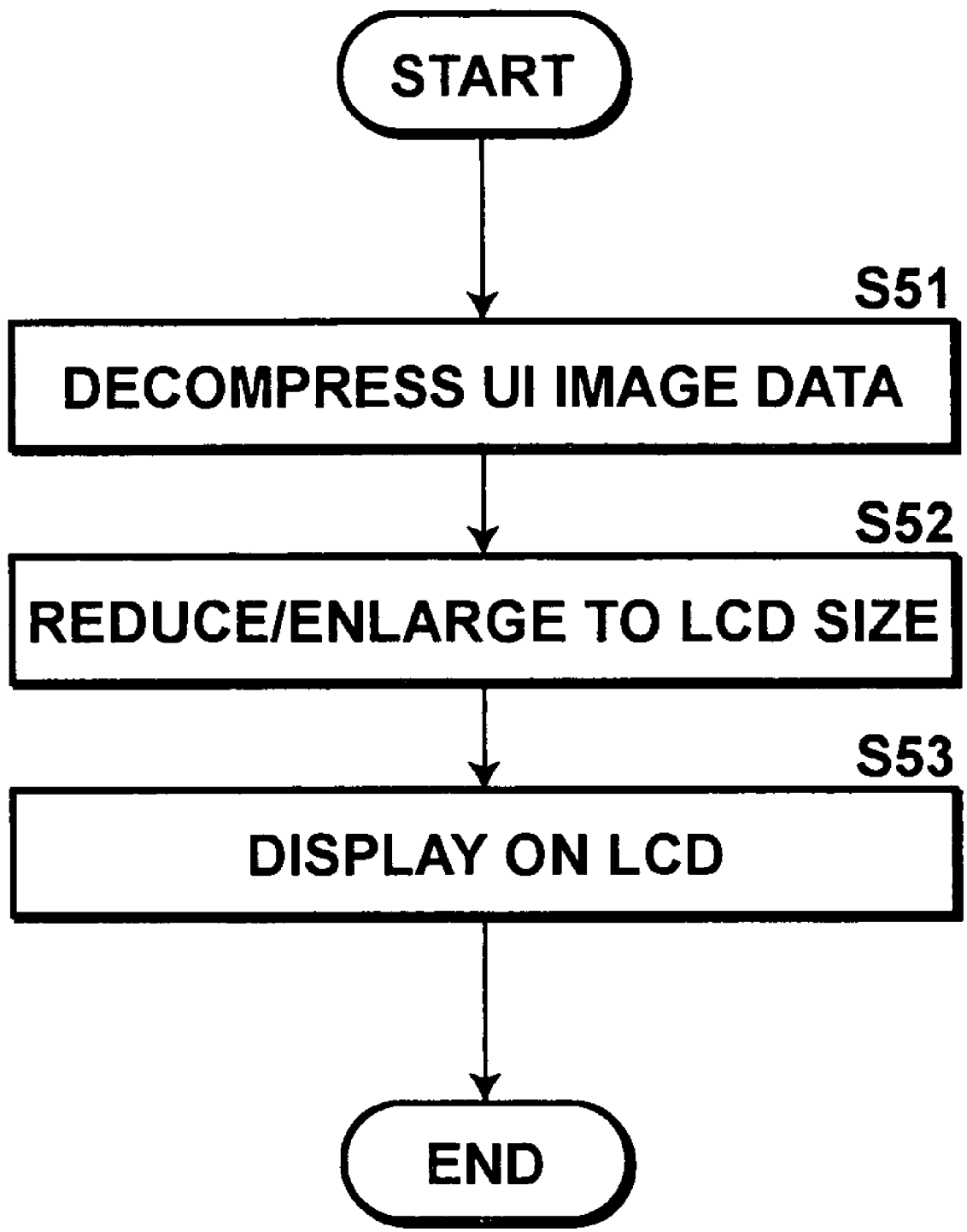
FIG. 14 is a flow chart showing a procedure for displaying an operation screen.

FIG. 14 is a flow chart showing the procedure for displaying the initial operation screen. The UI image data having the file name 0001.jpg are decompressed (Step S51), and reduced or enlarged to become suitable for the size of the LCD 14 (Step S52). The UI image 140 represented by the reduced or enlarged UI image data is displayed as the initial operation screen on the LCD 14 (Step S53) to end the procedure.

When the initial operation screen is displayed on the LCD 14, the user of the digital camera 1 selects one of the printing menus. At this time, the digital camera 1 carries out a procedure for selecting the print menu (Step S10).

Figure 15:
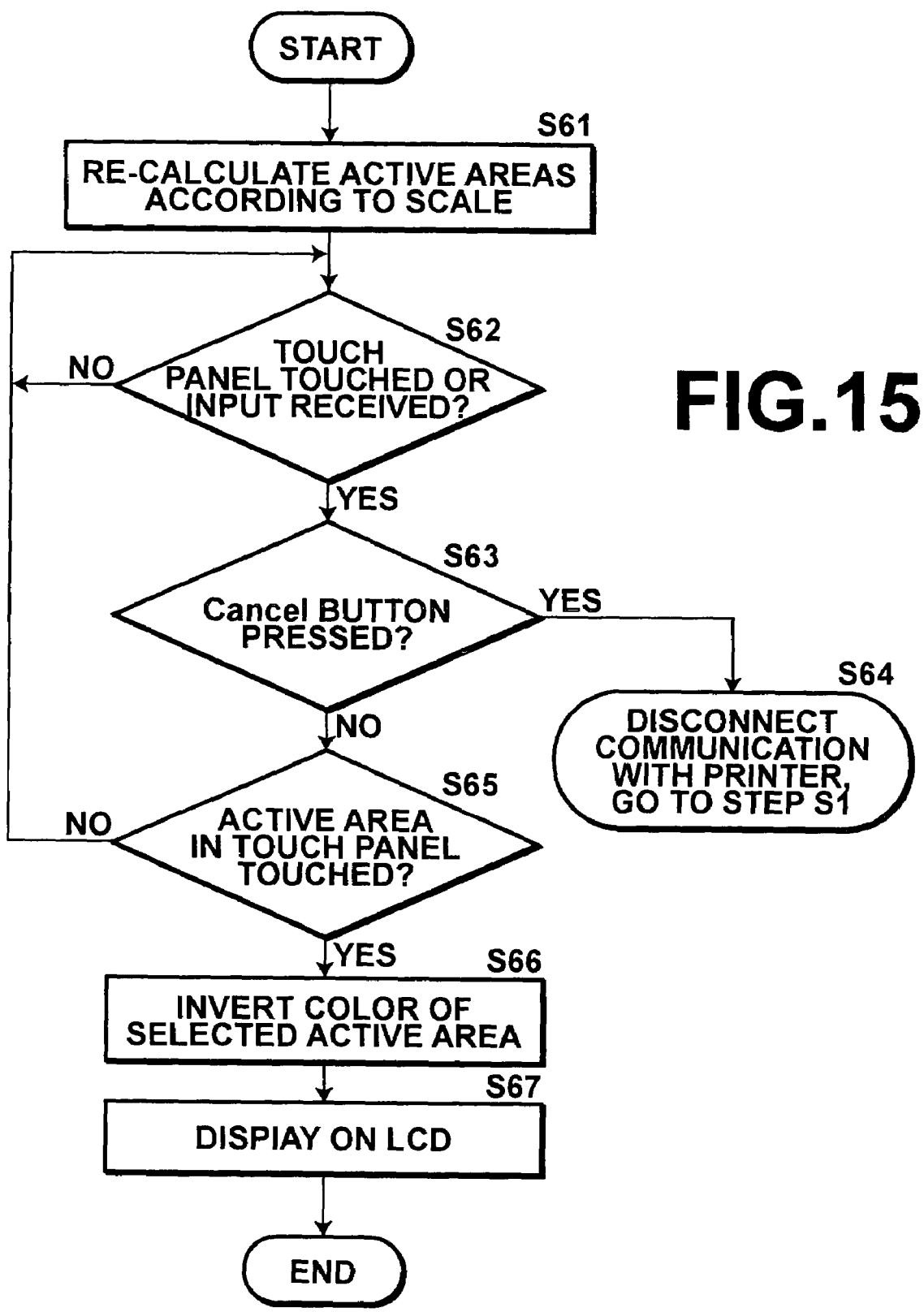
FIG. 15 is a flow chart showing a procedure for printing menu selection.

FIG. 15 is a flow chart showing the printing menu selection procedure. Assuming that the UI image data have been reduced or enlarged, the digital camera 1 re-calculates the positions and the sizes of the active areas 140B, 140C, and 140D according to a scale of the UI image data (Step S61). In this manner, the positions and the sizes of the active areas 140B, 140C, and 140D in the initial operation screen in the UI image 140 are related to those before the reduction or enlargement.

Whether or not the user has touched the touch panel 80 or whether or not any input has been received from the user is then monitored (Step S62). If a result at Step S62 is affirmative, whether or not the user has pressed the Cancel button 22 is then judged (Step S63). If a result at Step S63 is affirmative, the communication with the printer 2 is disconnected and the procedure returns to Step S1 (Step S64).

If the result at Step S63 is negative, whether or not the input has been carried out by touching any one of the active areas in the touch panel 80 is then judged (Step S65). If a result at Step S65 is negative, the procedure returns to Step S62. If the result at Step S65 is affirmative, the color of the selected active area is inverted (Step S66), and the operation screen having the active area in the inverted color is displayed on the LCD 14 (Step S67) to end the procedure.

Figure 16:
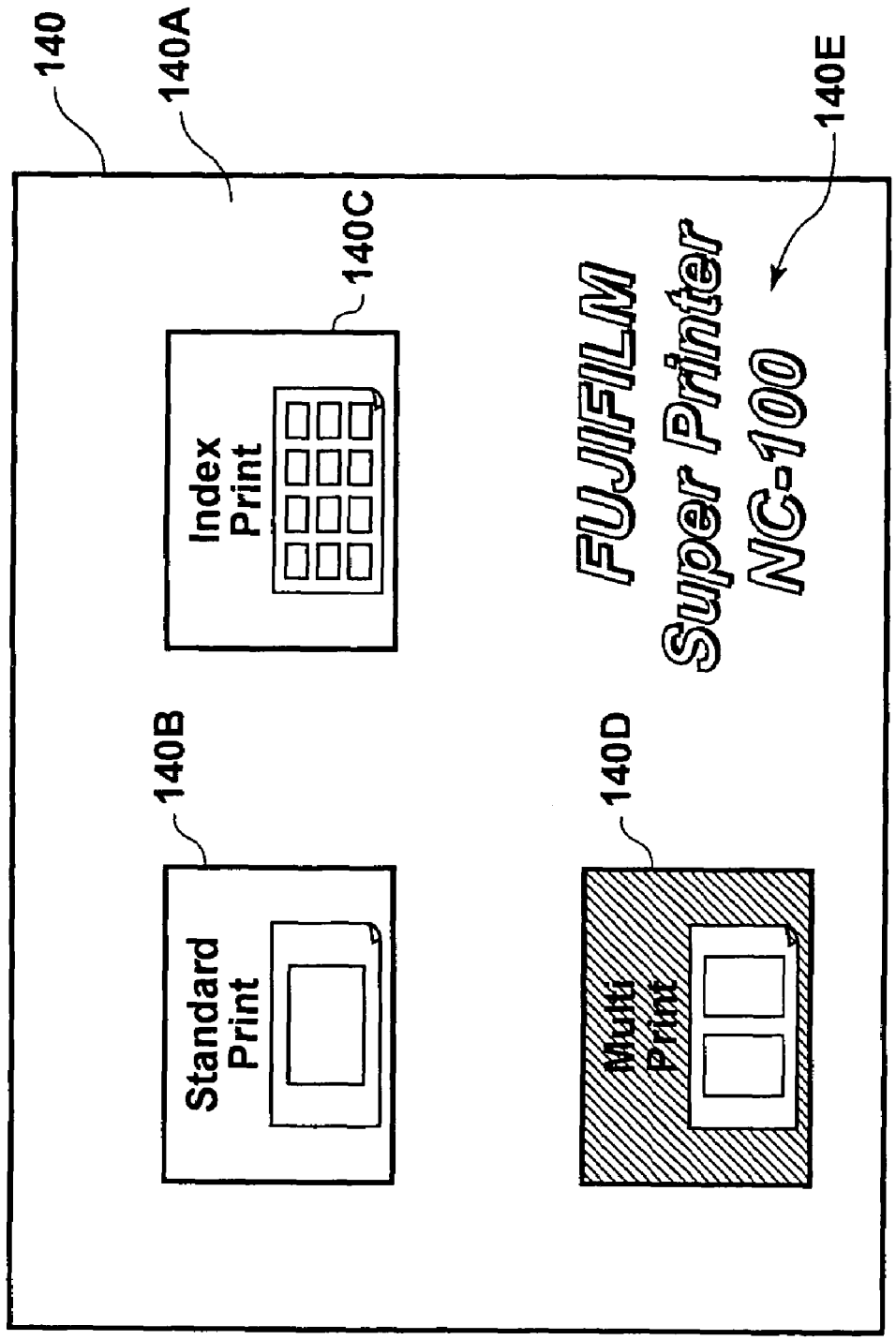
FIG. 16 shows a state wherein the color of a selected active area has been inverted.

In the case where the user has selected the printing menu MultiPrint for example, the color of the active area 140D corresponding to the menu is inverted as shown in FIG. 16. In this manner, the user can easily understand which of the active areas he/she has selected. Instead of inverting the color, the selected active area may be displayed in higher brightness or in black and white, or surrounded by a frame or the like, to represent which of the active areas has been selected by the user. In the explanation below, the user is assumed to have selected the printing menu MultiPrint.

In the case where the user has selected the menu MultiPrint shown in FIG. 11, the digital camera 1 obtains the hyperreference corresponding to the active area of MultiPrint (Step S11), and requests the UI description file whose file name is multi.xml from the printer 2 (Get(multi.xml) in FIG. 11) according to the description in the hyperreference (Step S12). The printer 2 sends the file multi.xml to the digital camera 1 in response to the request (Step S13).

Figure 17:
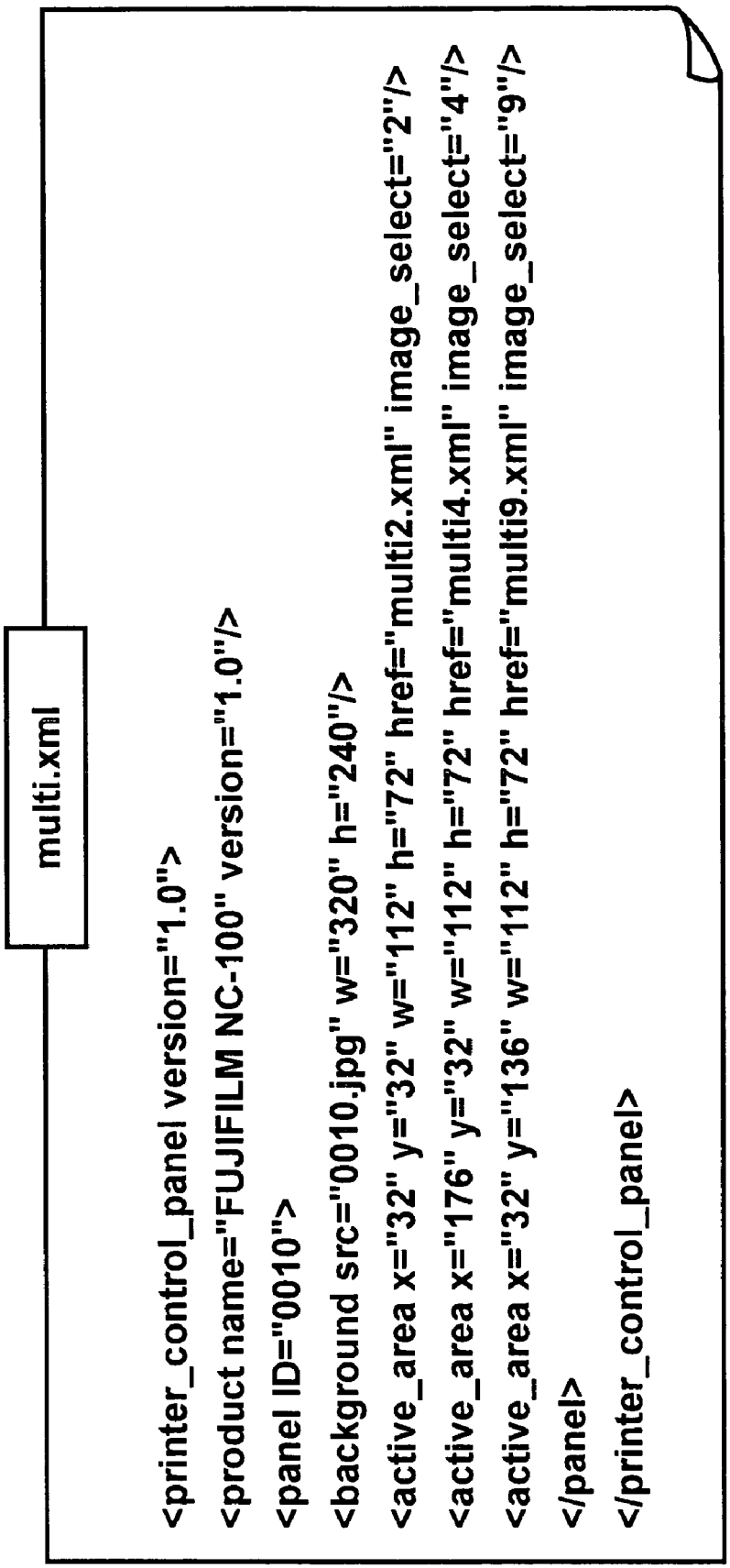
FIG. 17 shows descriptions in a file "multi.xml"

FIG. 17 shows the description in the file multi.xml. As shown in FIG. 17, the description in the fourth line in the file multi.xml specifies the UI image data having a file name 0010.jpg and having 320×240 pixels as the width w and the height h for the operation screen.

Figure 18:
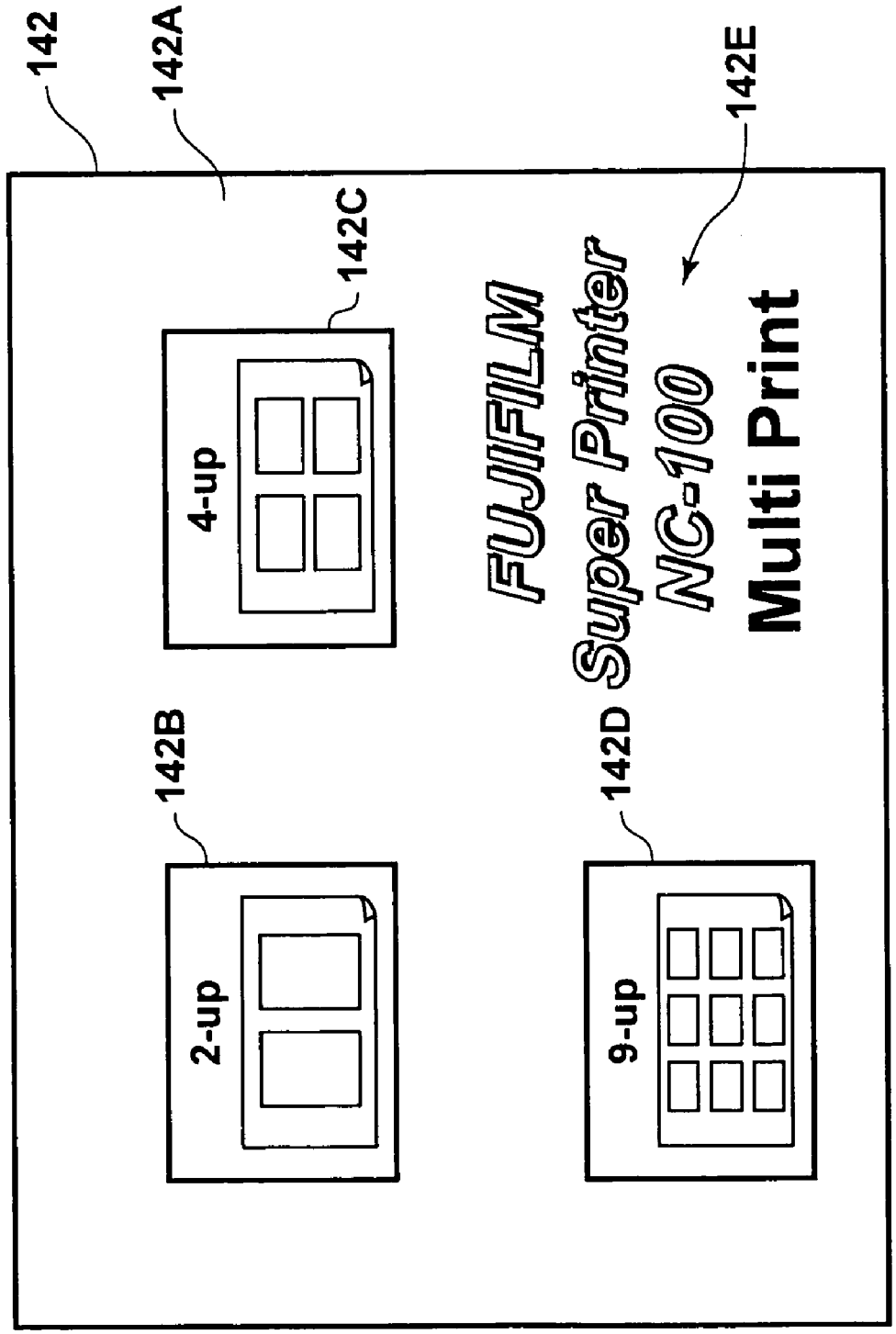
FIG. 18 shows a UI image represented by UI image data having a file name "0010.jpg"

FIG. 18 shows a UI image 142 represented by the UI image data having the file name 0010.jpg. As shown in FIG. 18, the UI image 142 comprises a background image 142A having therein three active areas 142B, 142C, and 142D as operation components and a logo 142E.

In the UI image 142 in FIG. 18, the active areas 142B, 142C, and 142D respectively represent printing menus "2-up", "4-up", and "9-up". The menu "2-up" is used for printing two images on one sheet while the menus "4-up" and "9-up" are respectively used for printing four and nine images on one sheet. By touching any one of the active areas 142B, 142C, and 142D, the user can select the corresponding one of the printing menus. The UI image 142 has the image size suitable for display on the virtual screen having the size (320×240 pixels) that is the standard for the digital camera 1, as in the case of the UI image 140.

The description in the fifth to seventh lines in the file multi.xml defines positions, sizes, and hyperreferences of the active areas 142B, 142C, and 142D. More specifically, the positions of the active areas are specified by the coordinates of the upper left corner thereof while the sizes thereof are specified by the width w and the height h. The hyperreferences show file names of the UI description files to be sent when the respective active areas are selected. The description "image_select" following the description of hyperreferences is a command for instructing the digital camera 1 to execute the image selection routine when the corresponding one of the active areas 142B, 142C, and 142D is selected, and for specifying the number of frames to be selected in the image selection routine.

The digital camera 1 interprets the file multi.xml (Step S14), and requests the UI image data whose file name is "0010.jpg" from the printer 2 ("Get(0010.jpg)" in FIG. 11) for display of the operation screen used in the menu Multi-Print (Step S15). The printer 2 sends the file 0010.jpg to the digital camera 1 in response to the request (Step S16). The digital camera 1 carries out a procedure for display of the file 0010.jpg as the operation screen (Step S17). The procedure is the same as the procedure at Step S9, and detailed explanations thereof are omitted.

When the operation screen is displayed on the LCD 14, the user of the digital camera 1 selects one of the printing menus. At this time, the digital camera 1 carries out a procedure for printing menu selection (Step S18). The procedure for printing menu selection is the same as the procedure at Step S10, and detailed explanations thereof are not repeated. The user is assumed to have selected the menu "2-up" in the UI image 142. In response to the selection, the color of the active area 142B in the UI image 142 is inverted.

When the user selects the menu "2-up", the digital camera 1 obtains the hyperreference corresponding to the active area of the menu "2-up" (Step S19), and requests from the printer 2 ("Get(multi2.xml)" in FIG. 11) the UI description file whose file name is "multi2.xml" as described in the hyperreference for the menu (Step S20). The printer 2 sends the file multi2.xml to the digital camera 1 in response to the request (Step S21). The printer 2 further prepares for printing corresponding to the menu "2-up" used in the menu MultiPrint (Step S22), and prepares for reception of images for two frames (Step S23).

Figure 19:
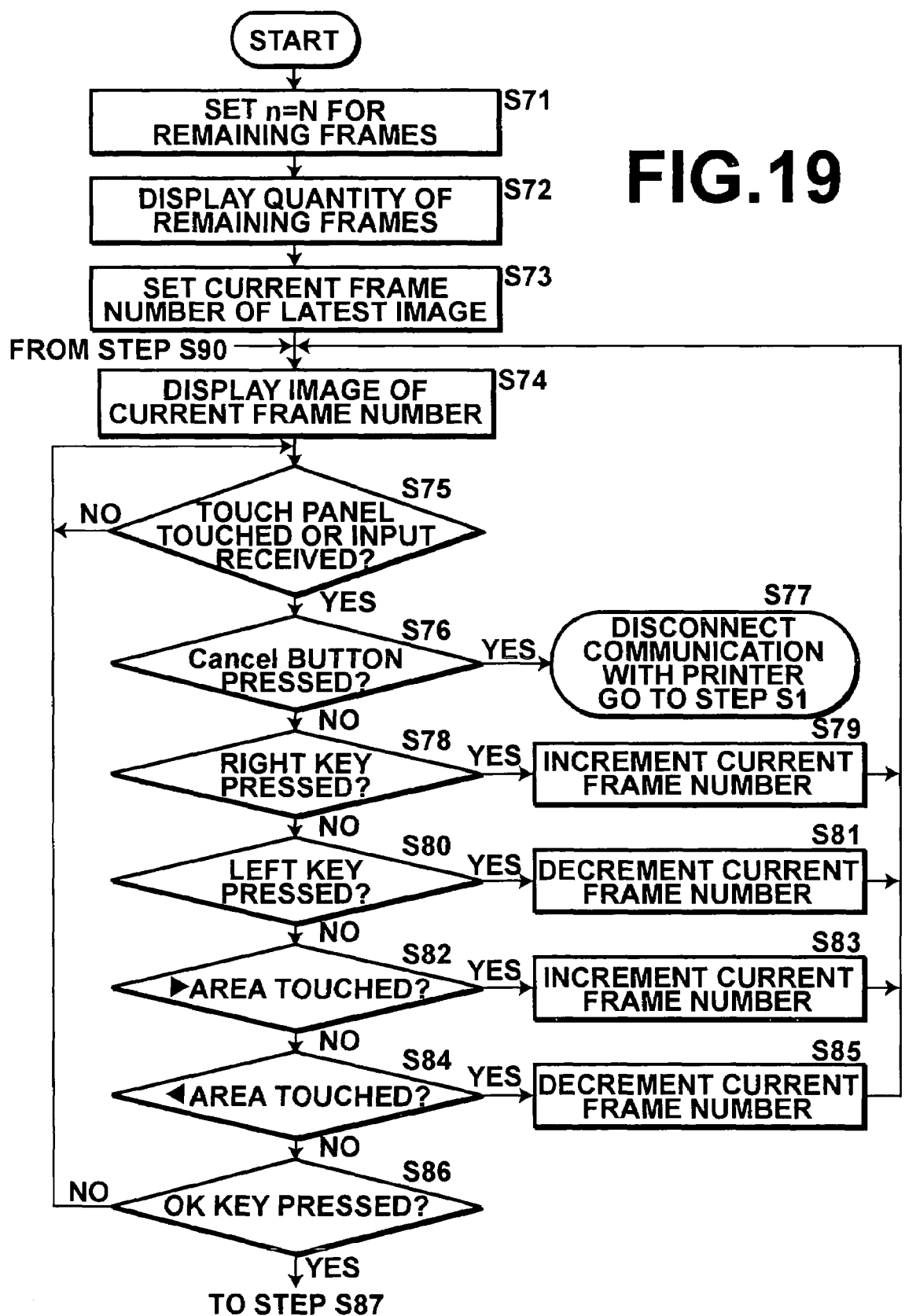
FIG. 19 is a flow chart (part 1) showing a procedure for image selection carried out in an image selection routine.
Figure 20:
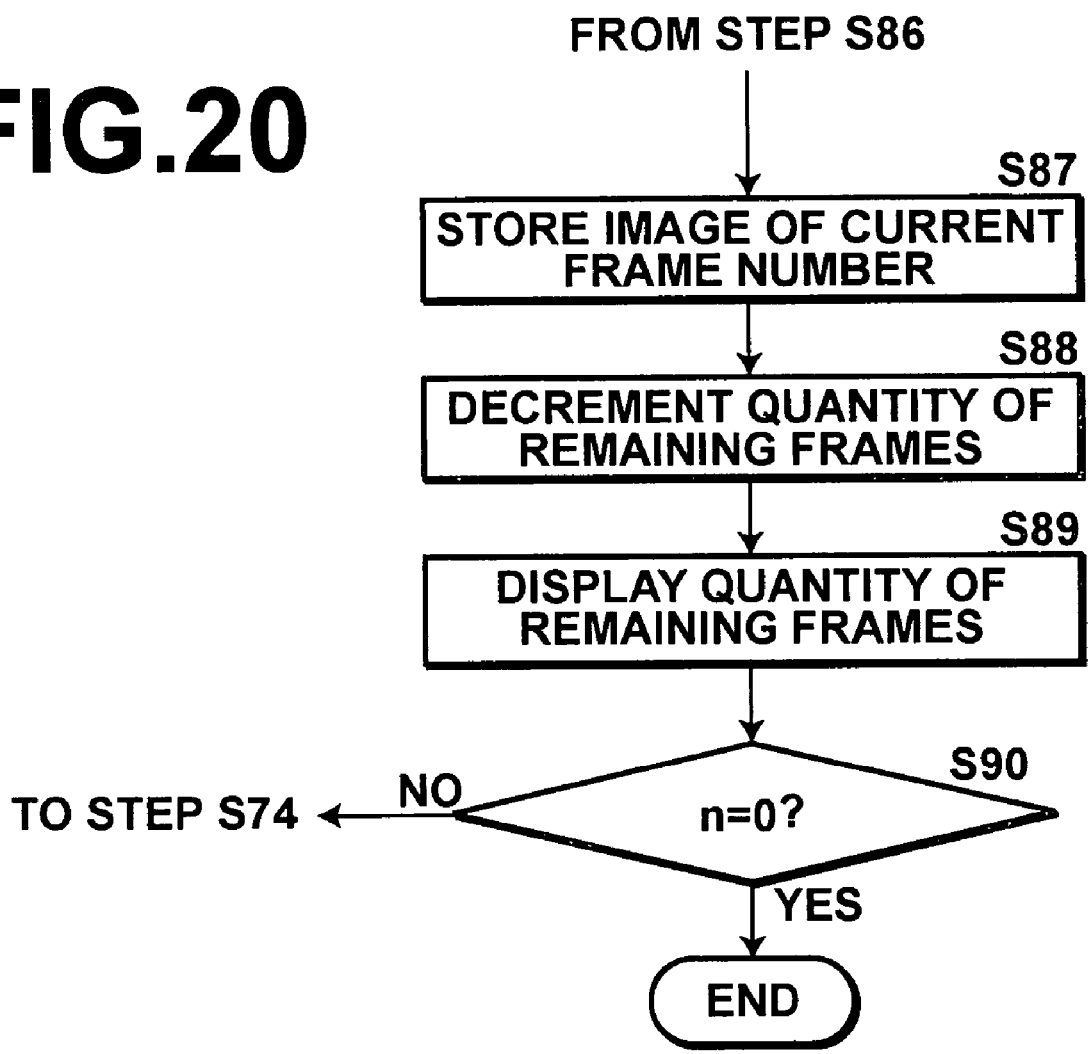
FIG. 20 is the flow chart (part 2) showing the procedure for image selection carried out in the image selection routine.

The digital camera 1 starts the program of the image selection routine according to an instruction of the command image_select corresponding to the active area for the menu "2-up" (Step S24). The image selection routine is used for selecting two of the image data sets to be printed in the menu 2-up from the image data sets stored in the memory card 60, as shown in FIG. 5. FIGS. 19 and 20 represent a flow chart showing an image selection procedure carried out in the image selection routine. The digital camera 1 sets a quantity of remaining frames (referred to as "n") to be selected (Step S71), and displays the quantity n on the LCD 14 (Step S72). The quantity n is the number "N" described in the command image_select corresponding to the active area selected by the user in the UI image 142 (the number is 2, in this case).

Figure 21:
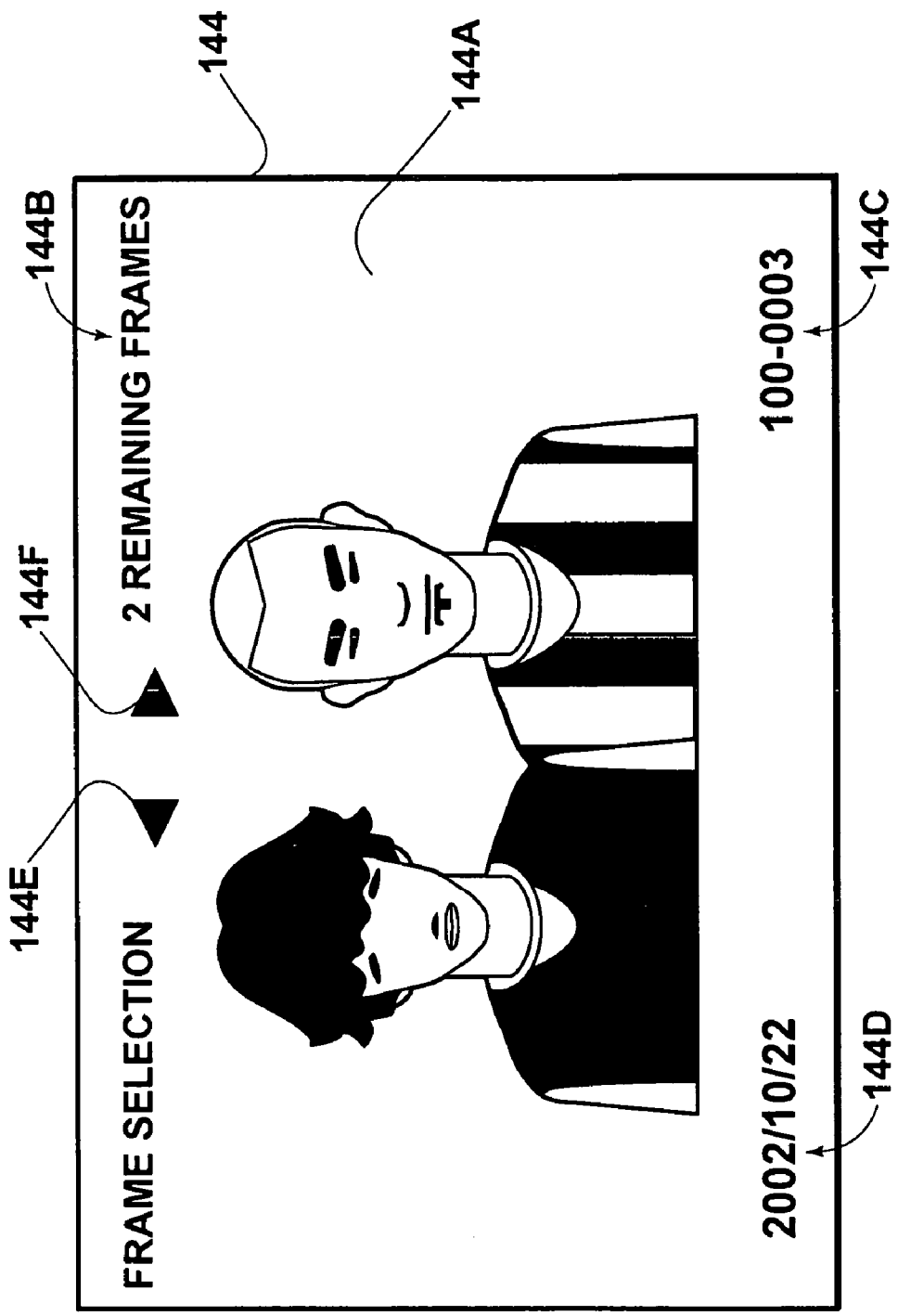
FIG. 21 shows an image selection screen used in the image selection routine.

The digital camera 1 sets a current frame number to be displayed on the LCD 14 to a frame number of the image data set photographed most recently (Step S73), and displays the image represented by the image data set of the current frame number on the LCD 14 (Step S74). Consequently, an image selection screen 44 shown in FIG. 21 is displayed on the LCD 14 in the image selection routine. As shown in FIG. 21, in the image selection screen 144 are displayed an image 144A having the current frame number, a number 144B representing the quantity n of the remaining frames to be selected, a number 144C representing the current frame number, a date 144D of photography, and right and left buttons 144F and 144E.

Whether or not the user has touched the touch panel 80 or whether or not any input has been received from the user is then monitored (Step S75). If a result at Step S75 is affirmative, whether or not the user has pressed the Cancel button 22 is then judged (Step S76). If a result at Step S76 is affirmative, the connection to the printer 2 is disconnected (Step S77), and the procedure returns to Step S1.

If the result at Step S76 is negative, whether or not the user has pressed the right key of the cruciform key 28 is then judged (Step S78). If a result at Step S78 is affirmative, the current frame number is incremented (Step S79), and the procedure returns to Step S74. If the result at Step S78 is negative, whether or not the user has pressed the left key of the cruciform key 28 is then judged (Step S80). If a result at Step S80 is affirmative, the current frame number is decremented (Step S81) and the procedure returns to Step S74.

If the result at Step S80 is negative, it is judged whether or not the user has touched the area of the right button 144F in the image selection screen 144 (Step S82). If a result at Step S82 is affirmative, the current frame number is incremented (Step S83), and the procedure returns to Step S74. If the result at Step S82 is negative, it is judged whether or not the user has pressed the area corresponding to the left button 144E in the image selection screen 144 (Step S84). If a result at Step S84 is affirmative, the current frame number is decremented (Step S85), and the procedure returns to Step S74.

If the result at Step S84 is negative, whether or not the user has pressed the OK button 24 is then judged (Step S86). If a result at Step S86 is negative, the procedure returns to Step S75. If the result at Step S86 is affirmative, the image data set corresponding to the current frame number is stored in the system memory 64 as the image data set to be printed (Step S87), and the quantity n of the remaining frames is decremented by 1 (Step S88) to be displayed on the LCD14 (Step S89). Whether or not the quantity n has become 0 is then judged (Step S90). If a result at Step S90 is negative, the procedure returns to Step S74. If the result at Step S90 is affirmative, selection of the image data sets to be printed is judged to be completed and the procedure ends.

The digital camera 1 sends to the printer 2 ("Put(the selected first-frame image)" in FIG. 12) the image data set selected first in the image selection routine after Step S24 in FIG. 12 (Step S25). The printer 2 receives the image data set and notifies ("OK" in FIG. 12) the digital camera 1 of the reception (Step S26). In this embodiment, the menu "2-up" has been selected, and the two image data sets have been selected in the digital camera 1. Therefore, the digital camera 1 sends the second-frame image data set to the printer 2 (Step S27), and the printer 2 notifies the digital camera 1 of the reception (Step S28). Thereafter, the printer 2 prints the two image data sets (Step S29).

FIG. 22 shows the description in the file multi2.xml. As shown in FIG. 22, the fourth line in the description specifies the UI image data having a file name 0031.jpg and having the width w of 320 pixels and the height h of 240 pixels. The UI image represented by the UI image data is used as the operation screen for notifying the user of completion of printing.

Figure 23:
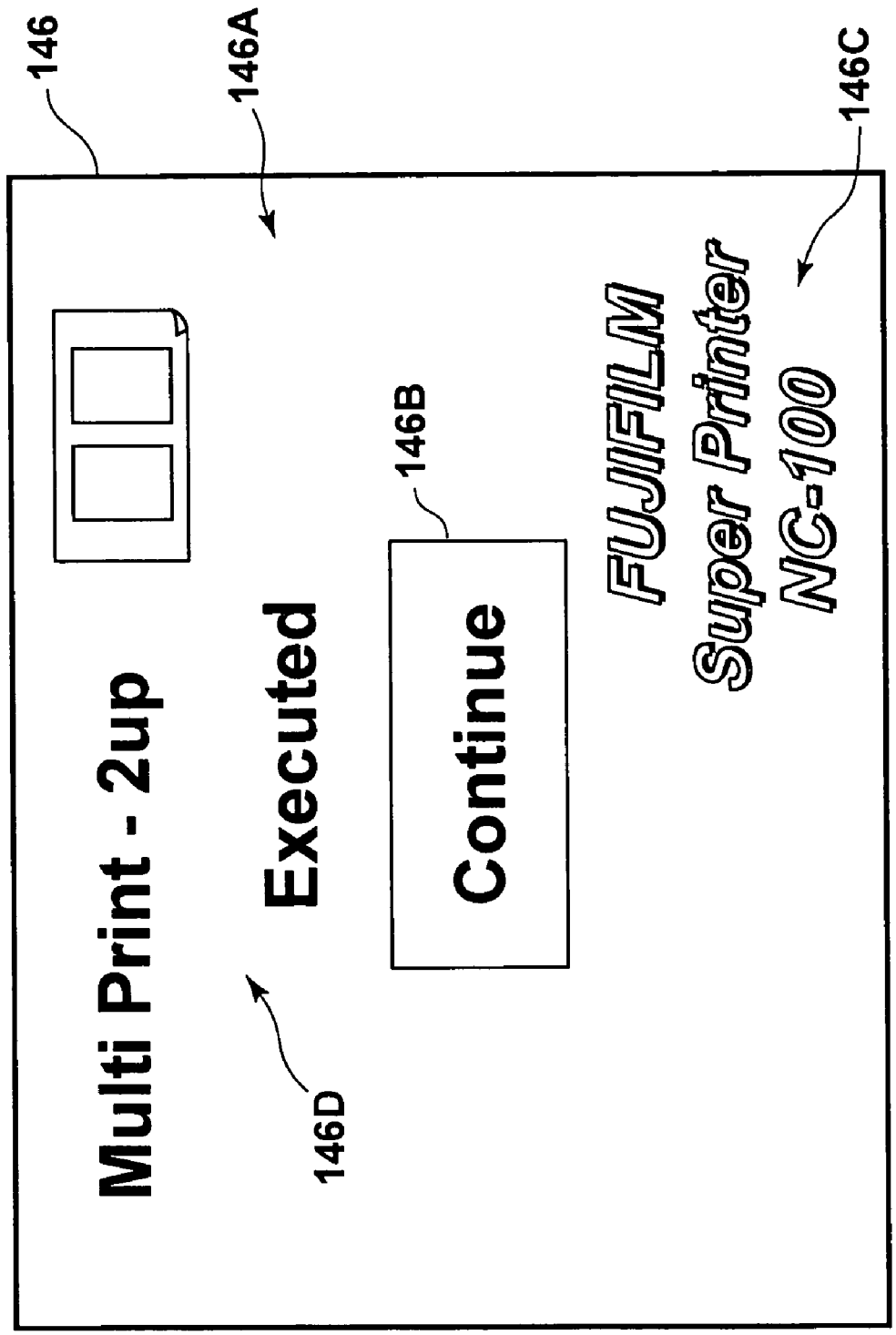
FIG. 23 shows a UI image represented by UI image data having a file name "0031.jpg".

FIG. 23 shows a UI image 146 represented by the UI image data whose file name is 0031.jpg. As shown in FIG. 23, the UI image 146 comprises a background image 146A. On the background image 146A are displayed an active area 146B, a logo 146C, and a character image 146D having characters "MultiPrint 2-up Executed" representing completion of printing in the printing menu 2-up of MultiPrint.

In the UI image 146 in FIG. 23, the active area 146B is used for selecting "Continue" for further printing. By touching the active area 146B, the user can further carry out printing. The UI image 146 also has the same image size (320×240 pixels) as the UI image 140 for display on the virtual screen having the standard size for the digital camera 1.

The description in the fifth line in the file multi2.xml defines a position of the active area 146B. More specifically, the coordinates of the upper left corner of the active area 146B represent the position thereof while the width w and the height h represent a size thereof. The name of the UI description file to be sent when the active area 146B is selected is also described as "href".

The digital camera 1 interprets the file multi2.xml (Step S30), and requests from the printer 2 ("Get(0031.jpg)" in FIG. 12) the UI image data having the file name 0031.jpg for display of the operation screen that notifies completion of printing (Step S31). The printer 2 sends the file 0031.jpg to the digital camera 1 in response to the request (Step S32). The digital camera 1 carries out a procedure for display of the file 0031.jpg as the operation screen (Step S33). The procedure is the same as the procedure at Step S9, and the detailed explanations thereof are omitted.

The operation screen is displayed on the LCD 14. When the user of the digital camera 1 touches the area Continue, the digital camera 1 understands the selection of the user (Step S34). In response to this selection, the digital camera 1 obtains the hyperreference for the active area Continue (Step S35), and requests from the printer 2 ("Get(startup.xml)" in FIG. 12) the UI description file having the file name "startup.xml" described in the hyperreference of the active area Continue (Step S36). The printer 2 sends the file startup.xml to the digital camera 1 (Step S37), and the procedure returns to Step S6.

As has been described above, according to this embodiment, the printer 2 provides the operation screens as the UI image data to the digital camera 1, and the digital camera 1 displays the UI image data as the operation screens on the LCD 14. Therefore, the operation screens can be displayed on the LCD 14 through the procedures carried out by the digital camera 1 on the UI image data provided from the printer 2. Therefore, the digital camera 1 does not need to have a font for character display, which leads to the simple configuration of the digital camera 1 for operation of the printer 2.

When the user inputs the instruction including selection of the image data sets after the UI image 142 for selecting the images to be printed is displayed on the digital camera 1, the image selection routine is started in the digital camera 1 for carrying out the procedure of image selection. Therefore, the printer 2 does not need to select the image data sets by accessing the digital camera 1 with an understanding of the data structure in the digital camera 1. Therefore, the digital camera 1 does not need to transfer the image data sets, a list of the image data sets, and thumbnail images to the printer 2, and the printer 2 does not need to generate the operation screen for image selection. Therefore, burdens on the digital camera 1 and on the printer 2 are lightened at the time of image selection. Especially, the image selection can be carried out without any special burden on the digital camera 1, since the digital camera 1 already has the functions of image display on the LCD 14 and image selection for printing.

The UI images representing the operation screens have the image size for display on the virtual screen, and the positions of the active areas in the operation screens are defined by the absolute coordinates in the virtual screen in the image size. Therefore, the digital camera 1 can display the operation screens on the LCD 14 thereof for operating the printer 2 by simply enlarging or reducing the UI images in accordance with the size of the LCD 14, without considering the positions of the active areas therein. In this manner, the digital camera 1 is less burdened at the time of display of the operation screens.

In addition, the UI image data is decompressed by the compression/decompression unit 56 of the digital camera 1. Therefore the need to provide the digital camera 1 with an additional means for decompressing the UI image data is obviated.

In the above embodiment, the digital camera 1 and the printer 2 are connected to each other for direct printing. However, the present invention is applicable to the case where a print order is placed by connecting the digital camera 1 to a print order reception apparatus installed in a DPE store. In this case, the print order reception apparatus functions as a server, and operation screens similar to those for the printer 2 are displayed on the digital camera 1. The apparatus receives the image data sets selected by the user from the digital camera 1 and sends the image data sets to a printer connected thereto. In this manner, printing can be carried out. The print order reception apparatus may display a printing charge and time necessary for printing, for notification to the user.

The present invention is also applicable to the case where the digital camera 1 sends the image data sets to an image server for storing and managing the image data sets, by accessing the image server via a network. In this case, the image server provides to the digital camera 1 an operation screen for sending the image data sets, as in the case of the printer 2. In this manner, the user of the digital camera 1 can send the image data sets obtained by the digital camera 1 to the image server by operation via the operation screen.

In the case where the image server is connected to a print server, a print order can be placed at the same time. In this case, the image server provides to the digital camera 1 an operation screen for placing a print order. Selection of an agency at which a print is received or selection of a service menu that is different in each store can also be carried out. In either case, the print order can be placed without a burden on the digital camera 1, by simply providing the operation screen as image data.

In the above embodiment, direct printing is carried out by connecting the digital camera 1 to the printer 2. However, the present invention can be applied to any browsing system comprising a server and a client for browsing an operation screen for operating the server. For example, in the case where a browsing system is configured by a mobile terminal such as a cellular phone or a PDA and an image server for storing and managing image data, the mobile terminal can display characters more easily than a digital camera. However, if an operation screen for operating the server is provided to the mobile terminal as an image including an operation component of the operation screen, the operation screen can be displayed faster, due to lack of procedures for display of characters with use of character codes and for positioning of the operation component.

What is claimed is:

1. A browsing system comprising a digital camera and a printer,
   the printer providing to the digital camera an operation screen including an operation component for operating the printer as content to be browsed, and
   the digital camera comprising browsing means for browsing the content, a display screen for displaying the operation screen as the content to be browsed, and operation means for receiving an instruction to operate the printer via the operation screen, wherein the printer provides to the digital camera the operation screen comprising only an image including the operation component as the content to be browsed, wherein the operation component comprises at least one of:
- a button for selecting an operation command included in the operation screen,
- characters comprising the operation command, and
- a mark indicating an active area used in the case of a touch panel, wherein the printer operates based on the instruction received by the operation means of the digital camera;

wherein the operation screen has an image size suitable for display on a virtual screen of a predetermined size and has layout of the operation component defined by absolute coordinates in the image size and the digital camera displays the operation screen on the display screen by reducing or enlarging the operation screen according to a size of the display screen; and wherein the operation screen comprises image data of JPEG format and the operation component is laid out in the operation screen by causing a boundary of the operation component in the operation screen to be located at a position corresponding to a multiple of the number of pixels in a compression block in the image data of the JPEG format.

2. The browsing system according to claim 1, wherein the digital camera further comprises storage means for storing image data and control means for carrying out procedures for display of the image data on the display screen and for selection from the image data.

3. The browsing system according to claim 2, wherein the control means is activated for carrying out the procedure of selection from the image data when the operation means receives an instruction to start selection from the image data via an operation screen therefor.

4. The browsing system according to claim 1, wherein the operation means comprises at least one of:
- a key or a button for selecting an operation command in the operation screen, and
- a touch panel for selecting the operation command by touching the operation screen.

5. The browsing system according to claim 1, wherein the digital camera and the printer are connected to each other by wired connection.

6. The browsing system according to claim 1, wherein the digital camera and the printer are connected wirelessly to each other.

7. A browsing system comprising a digital camera and a printer, the printer providing to the digital camera an operation screen including an operation component for operating the printer as content to be browsed, wherein the operation component comprises at least one of:
- a button for selecting an operation command included in the operation screen,
- characters comprising the operation command, and
- a mark indicating an active area used in the case of a touch panel, and the digital camera comprising browsing means for browsing the content, a display screen for displaying the operation screen as the content to be browsed, operation means for receiving an instruction to operate the printer via the operation screen, imaging means for obtaining image data by photography, storage means for storing the image data, and control means for carrying out procedures for display of the image data on the display screen and for selection from the image data, wherein the control means is activated for carrying out the procedure for selection from the image data when the operation means receives an instruction to start selection from the image data via an operation screen therefor, wherein the printer operates based on the instruction received by the operation means of the digital camera;

wherein the operation screen has an image size suitable for display on a virtual screen of a predetermined size and has layout of the operation component defined by absolute coordinates in the image size and the digital camera displays the operation screen on the display screen by reducing or enlarging the operation screen according to a size of the display screen; and wherein the operation screen comprises image data of JPEG format and the operation component is laid out in the operation screen by causing a boundary of the operation component in the operation screen to be located at a position corresponding to a multiple of the number of pixels in a compression block in the image data of the JPEG format.

8. An imaging apparatus comprising an imaging means for obtaining image data; and a compressing/decompressing means for compressing and decompressing the image data, for use as a client in the browsing system defined in claim 1, wherein:

in the case that the operation screen is compressed image data of the operation screen, the compressing/decompressing means decompresses the compressed image data of the operation screen.

9. An imaging apparatus comprising a compressing/decompressing means for compressing and decompressing image data obtained by photography, for use as a digital camera in the browsing system defined in claim 7, wherein:

in the case that the operation screen is compressed image data of the operation screen, the compressing/decompressing means decompresses the compressed image data of the operation screen.

* * * * *